United States Patent
Kodama et al.

(10) Patent No.: US 8,703,892 B2
(45) Date of Patent: Apr. 22, 2014

(54) CURABLE COMPOSITION FOR IMPRINTS, PATTERNING METHOD AND PATTERN

(75) Inventors: Kunihiko Kodama, Shizuoka (JP); Akinori Fujita, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 1186 days.

(21) Appl. No.: 12/499,269

(22) Filed: Jul. 8, 2009

(65) Prior Publication Data

US 2010/0009138 A1 Jan. 14, 2010

(30) Foreign Application Priority Data

Jul. 10, 2008 (JP) ................................. 2008-179987
Jun. 18, 2009 (JP) ................................. 2009-145523

(51) Int. Cl.
*C08F 18/16* (2006.01)

(52) U.S. Cl.
USPC ........................ 526/322; 526/323.2; 428/64.2

(58) Field of Classification Search
USPC .............. 428/64.1, 64.4, 65.1, 64.2; 522/182; 526/322, 323.2
See application file for complete search history.

(56) References Cited

U.S. PATENT DOCUMENTS

| | | | | |
|---|---|---|---|---|
| 3,709,805 | A * | 1/1973 | Krauch et al. | 21/50.5 |
| 3,890,150 | A * | 6/1975 | Hasegawa et al. | 430/283.1 |
| 4,443,588 | A * | 4/1984 | Fukuda et al. | 526/301 |
| 8,025,833 | B2 * | 9/2011 | Kodama et al. | 264/496 |
| 2010/0009287 | A1 * | 1/2010 | Kodama | 430/270.1 |

FOREIGN PATENT DOCUMENTS

| | | | |
|---|---|---|---|
| JP | 61123603 A | * | 6/1986 |
| JP | 08-034763 A | | 2/1996 |
| JP | 2004346125 A | * | 12/2004 |

OTHER PUBLICATIONS

Machine translation of JP 2004-346125 acquired on Feb. 7, 2013.*
Data sheet for 1,4-butanediol diacrylate acquired from http://www.sartomer.com/wpapers/2020.pdf on Feb. 7, 2013.*
Rosen, Milton et al. "Surfactants and Interfacial Phenomena", John Wiley & Sons, 2004, p. 303-331.*
Photocurable monomer/oligomers of Shin-Nakamura Chemicals obtained from http://www.shin-nakamura.com/english/products/monomer-oligomer.html on Aug. 10, 2013.*
Office Action mailed Feb. 19, 2013 in Japanese Application No. 2009-145523 English-Language translation.
Office Action mailed Nov. 26, 2013 in Japanese Application No. 2009-145523.

* cited by examiner

*Primary Examiner* — Gerard Higgins
(74) *Attorney, Agent, or Firm* — Sughrue Mion, PLLC

(57) ABSTRACT

A curable composition for imprints, comprising a polymerizable monomer (Ax) represented by the following formula:

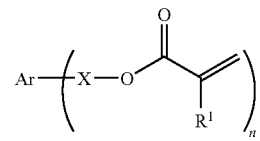

wherein Ar represents a divalent or trivalent aromatic group, X represents a single bond or an organic linking group, $R^1$ represents a hydrogen atom or an alkyl group, and n represents 2 or 3. The content of the polymerizable monomer (Ax) is 45% by mass or more, or the total content of solid polymerizable monomers and liquid polymerizable monomers with high viscosity is less than 50% by mass.

15 Claims, No Drawings

CURABLE COMPOSITION FOR IMPRINTS, PATTERNING METHOD AND PATTERN

BACKGROUND OF THE INVENTION

1. Field of the Invention

The present invention relates to a curable composition for imprints. More precisely, the invention relates to a curable composition for micropatterning to give imprints, which is used in producing magnetic recording media such as semiconductor integrated circuits, flat screens, microelectromechanical systems (MEMS), sensor devices, optical discs, high-density memory discs, etc.; optical members such as gratings, relief holograms, etc.; optical films for production of nanodevices, optical devices, flat panel displays, etc.; polarizing elements, thin-film transistors in liquid-crystal displays, organic transistors, color filters, overcoat layers, pillar materials, rib materials for liquid-crystal alignment, microlens arrays, immunoassay chips, DNA separation chips, microreactors, nanobio devices, optical waveguides, optical filters, photonic liquid crystals, etc.

2. Description of the Related Art

Imprint technology is a development advanced from embossing technology well known in the art of optical disc production, which comprises pressing a mold original with an embossed pattern formed on its surface (this is generally referred to as "mold", "stamper" or "template") against a resin to thereby accurately transfer the micropattern onto the resin through mechanical deformation of the resin. In this, when a mold is once prepared, then microstructures such as nanostructures can be repeatedly molded, and therefore, this is economical, and in addition, harmful wastes and discharges from this nanotechnology are reduced. Accordingly these days, this is expected to be applicable to various technical fields.

Two methods of imprint technology have been proposed; one is a thermal imprint method using a thermoplastic resin as the material to be worked (for example, see S. Chou, et al., Appl. Phys. Lett. Vol. 67, 3114 (1995)), and the other is a photoimprint method using a photocurable composition (for example, see M. Colbun, et al., Proc. SPIE, Vol. 3676, 379 (1999)). In the thermal imprint method, a mold is pressed against a polymer resin heated up to a temperature not lower than the glass transition temperature thereof, then the resin is cooled and thereafter released from the mold to thereby transfer the microstructure of the mold onto the resin on a substrate. The method is applicable to various resin materials and glass materials and is expected to be applicable to various fields. For example, U.S. Pat. Nos. 5,772,905 and 5,956,216 disclose a imprint method of forming nanopatterns inexpensively.

On the other hand, in the photoimprint method where a composition for photoimprints is photocured by photoirradiation through a transparent mold or a transparent substrate, the transferring material does not require heating in pressing it against the mold, and therefore the method enables room-temperature imprinting. Recently, new developments having the advantages of the above two as combined, have been reported, including a nanocasting method and a reversal imprint method for forming three-dimensional structures.

For the imprint methods as above, proposed are applied technologies to nano-scale mentioned below.

In the first technology, the molded pattern itself has a function, and is applied to various elements in nanotechnology and to structural members. Its examples include various micro/nano optical elements and high-density recording media, as well as structural members in optical films, flat panel displays, etc. The second technology is for hybrid-molding of microstructures and nanostructures, or for construction of laminate structures through simple interlayer positioning, and this is applied to production of µ-TAS (micro-total analysis system) and biochips. In the third technology, the formed pattern is used as a mask and is applied to a method of processing a substrate through etching or the like. In these technologies, high-precision positioning is combined with high-density integration; and in place of conventional lithography technology, these technologies are being applied to production of high-density semiconductor integrated circuits and transistors in liquid-crystal displays, and also to magnetic processing for next-generation hard discs referred to as patterned media. Recently, the action on industrialization of the above-mentioned imprint technologies and their applied technologies has become active for practical use thereof.

As one example of imprint technology, hereinunder described is an application to production of high-density semiconductor integrated circuits. The recent development in micropatterning and integration scale enlargement in semiconductor integrated circuits is remarkable, and high-definition photolithography for pattern transfer for realizing the intended micropatterning is being much promoted and advanced in the art. However, for further requirement for more definite micropatterning to a higher level, it is now difficult to satisfy all the three of micropattern resolution, cost reduction and throughput increase. Regarding this, as a technology of micropatterning capable of attaining at a low cost, imprint lithography, particularly imprint lithography (photoimprint technology) is proposed. For example, U.S. Pat. Nos. 5,772,905 and 5,259,926 disclose a imprint technology of using a silicon wafer as a stamper for transferring a microstructure of at most 25 nm. This application requires micropatternability on a level of a few tens nm and high-level etching resistance of the micropattern functioning as a mask in substrate processing.

An application example of imprint technology to production of next-generation hard disc drives (HDD) is described. Based on head performance improvement and media performance improvement closely connected with each other, the course of HDD history is for capacity increase and size reduction. From the viewpoint of media performance improvement, HDD has realized increased large-scale capacity as a result of the increase in the surface-recording density thereon. However, in increasing the recording density, there occurs a problem of so-called magnetic field expansion from the side surface of the magnetic head. The magnetic field expansion could not be reduced more than a certain level even though the size of the head is reduced, therefore causing a phenomenon of so-called sidelight. The sidelight, if any, causes erroneous writing on the adjacent tracks and may erase the already recorded data. In addition, owing to the magnetic field expansion, there may occur another problem in that superfluous signals may be read from the adjacent track in reproduction. To solve these problems, there are proposed technologies of discrete track media and bit patterned media of filling the distance between the adjacent tracks with a non-magnetic material to thereby physically and magnetically separate the tracks. As a method of forming the magnetic or non-magnetic pattern in production of these media, application of imprint technology is proposed. The application also requires micropatternability on a level of a few tens nm and high-level etching resistance of the micropattern functioning as a mask in substrate processing.

Next described is an application example of imprint technology to flat displays such as liquid-crystal displays (LCD) and plasma display panels (PDP).

With the recent tendency toward large-sized LCD substrates and PDP substrates for high-definition microprocessing thereon, photoimprint lithography has become specifically noted these days as an inexpensive lithography technology capable of being substituted for conventional photolithography for use in production of thin-film transistors (TFT) and electrode plates. Accordingly, it has become necessary to develop a photocurable resist capable of being substituted for the etching photoresist for use in conventional photolithography.

Further, for the structural members for LCD and others, application of photoimprint technology to transparent protective film materials described in JP-A-2005-197699 and 2005-301289, or to spacers described in JP-A-2005-301289 is being under investigation. Differing from the above-mentioned etching resist, the resist for such structural members finally remains in displays, and therefore, it may be referred to as "permanent resist" or "permanent film".

The spacer to define the cell gap in liquid-crystal displays is also a type of the permanent film; and in conventional photolithography, a photocurable composition comprising a resin, a photopolymerizable monomer and an initiator has been generally widely used for it (for example, see JP-A-2004-240241). In general, the spacer is formed as follows: After a color filter is formed on a color filter substrate, or after a protective film for the color filter is formed, a photocurable composition is applied thereto, and a pattern having a size of from 10 μm or 20 μm or so is formed through photolithography, and this is further thermally cured through past-baking to form the intended spacer.

Further, imprint lithography is useful also in formation of permanent films in optical members such as microelectromechanical systems (MEMS), sensor devices, gratings, relief holograms, etc.; optical films for production of nanodevices, optical devices, flat panel displays, etc.; polarizing elements, thin-film transistors in liquid-crystal displays, organic transistors, color filters, overcoat layers, pillar materials, rib materials for liquid-crystal alignment, microlens arrays, immunoassay chips, DNA separation chips, microreactors, nanobio devices, optical waveguides, optical filters, photonic liquid crystals, etc.

In application to such permanent films, the formed pattern remains in the final products, and is therefore required to have high-level properties of mainly film durability and strength, including heat resistance, light resistance, solvent resistance, scratch resistance, high-level mechanical resistance to external pressure, hardness, etc.

Almost all patterns heretofore formed in conventional photolithography can be formed in imprint technology, which is therefore specifically noted as a technology capable of forming micropatterns inexpensively.

It is an assumption that these applications form a good pattern, however, with regard to the photoimprint method in the patterning, it is necessary for a liquid curable composition to be sufficiently charged in a mold, and the composition is required to have a low viscosity. Furthermore, for industrial use, stability over time is important, and if the viscosity changes over time, the patternability changes, which thus leads to a problem that a good pattern cannot be mass produced. Further, if foreign bodies are generated over time, there occurs a problem that the foreign bodies themselves become pattern defects, or a problem that when a mold is forcibly imposed onto a curable composition while pressed, the foreign bodies destroy the mold, thereby continuously generating defects at a time of later imprint. As such, in the curable composition for imprints, stability over time is very important, but measures for improving the stability over time, and further, measures for making it compatible with product performances such as dry etching resistance and membrane strength have not been substantially discussed hitherto.

JP-A-2004-346125 and JP-A-2006-152115 describe an example in which a microlens array having the characteristics of a good refractive index is fabricated using a curable composition comprising a xylylene acrylate and a specific fluorene-type polymerizable monomer. However, JP-A-2004-346125 and JP-A-2006-152115 also did not examine stability over time.

As described above, in the industrial use of a imprints method, the patternability of the curable composition for imprints is important, and in particular, the ability to stably form a pattern even when a curable composition is left over time is important. Furthermore, in the curable composition for imprints, membrane characteristics according to the applications, such as etching resistance and pattern durability are required.

The present inventors have reviewed the stability over time for the curable compositions as described in JP-A-2004-346125 and JP-A-2006-152115 for the purpose of improving the stability over time, and as a result, they have found that the stability over time of the curable compositions was not sufficient. They have also found that the dry etching resistance of the curable compositions was not sufficient.

SUMMARY OF THE INVENTION

It is an object of the invention to provide a curable composition for imprints used in the imprints lithography which has high stability over time, which is thus capable of stably forming a pattern even when the curable composition is left over time, and which has high etching resistance required for the applications of processing a substrate; a patterning method using the same, and a pattern obtained by the patterning method.

The present inventors have studied the components and the composition of the curable compositions as described in JP-A-2004-346125 and JP-A-2006-152115 in detail in order to solve the above problems. As a result, they have found that curable compositions comprising at least one polymerizable monomer having a limited structure and satisfying a specific condition only shows remarkably improved stability over time and etching resistance.

The present inventors have thus found that the following constitutions can solve the above problems to complete the invention:

[1] A curable composition for imprints, comprising at least one polymerizable monomer and a photopolymerization initiator, wherein:

the curable composition for imprints comprises at least one polymerizable monomer (Ax) represented by the following formula (I):

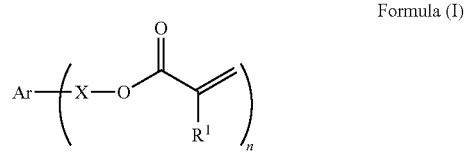

Formula (I)

wherein Ar represents a divalent or trivalent aromatic group which may have a substituent, X represents a single bond or an organic linking group, $R^1$ represents a hydrogen atom or an alkyl group which may have a substituent, and n represents 2 or 3, and the curable composition for imprints satisfies at least one of the following (A) and (B):

(A) the content of the polymerizable monomer (Ax) represented by the formula (I) in the curable composition for imprints is 45% by mass or more, relative to all the polymerizable monomers contained in the composition, and (B) the total content of polymerizable monomers which are solid at 25° C. and polymerizable monomers having a viscosity at 25° C. of 70 mPa·s or more in the curable composition for imprints is less than 50% by mass, relative to all the polymerizable monomers contained in the composition.

[2] The curable composition for imprints as described in [1], wherein the content of the polymerizable monomer (Ax) represented by the formula (I) in the curable composition for imprints is 45% by mass or more, relative to all the polymerizable monomers contained in the composition.

[3] The curable composition for imprints as described in [1] or [2], wherein the total content of polymerizable monomers which are solid at 25° C. and polymerizable monomers having a viscosity at 25° C. of 70 mPa·s or more in the curable composition for imprints is less than 50% by mass, relative to all the polymerizable monomers contained in the composition.

[4] The curable composition for imprints as described in any one of [1] to [3], wherein 80% by mass or more of all the polymerizable monomers contained in the curable composition for imprints is a polymerizable monomer which is liquid at 25° C.

[5] The curable composition for imprints as described in any one of [1] to [4], wherein the content of the polymerizable monomer (Ax) represented by the formula (I) in the curable composition for imprints is more than 50% by mass, relative to all the polymerizable monomers contained in the composition.

[6] The curable composition for imprints as described in any one of [1] to [5], wherein in the formula (I), Ar is a phenylene group.

[7] The curable composition for imprints as described in any one of [1] to [6], wherein the polymerizable monomer is a polymerizable monomer represented by the following formula (I-a) or (I-b):

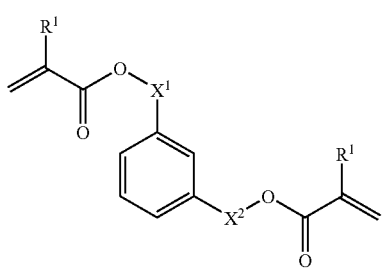

Formula (I-a)

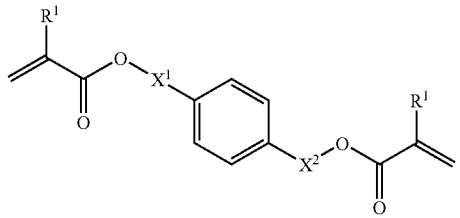

Formula (I-b)

wherein $X^1$ and $X^2$ each independently represent a single bond or an alkylene group which may have a substituent having from 1 to 3 carbon atoms, and $R^1$ represents a hydrogen atom or a methyl group.

[8] The curable composition for imprints as described in any one of [1] to [7], wherein the polymerizable monomer (Ax) is liquid at 25° C.

[9] The curable composition for imprints as described in any one of [1] to [8], wherein the polymerizable monomer comprises a monofunctional (meth)acrylate having at least one structure of an aromatic ring structure or an alicyclic hydrocarbon structure.

[10] The curable composition for imprints as described in any one of [1] to [9], which further comprises at least one of a nonionic surfactant or an antioxidant.

[11] A patterning method comprising:

applying the curable composition for imprints as described in any one of [1] to [10] onto a substrate to form a patterning layer thereon, pressing a mold against the surface of the patterning layer, and irradiating the patterning layer with light.

[12] A pattern obtained by the patterning method of [11].

According to the present invention, a curable composition for imprints which has high stability over time, which is thus capable of stably forming a pattern even when the curable composition is left over time, and which is excellent in etching resistance, can be provided. More specifically, a curable composition for imprints which satisfies all the three aspects, that is, the high-temperature stability over time, the low-temperature stability over time, and the dry etching resistance at high levels, respectively, can be provided. Furthermore, by the patterning method of the invention using the curable composition for imprints of the invention, a pattern which is excellent in etching resistance can be provided,

BEST MODE FOR CARRYING OUT THE INVENTION

The contents of the invention are described in detail hereinunder. In this specification, the numerical range expressed by the wording "a number to another number" means the range that falls between the former number indicating the lowermost limit of the range and the latter number indicating the uppermost limit thereof. In this specification, mass ratio is equal to weight ratio.

In this specification, "(meth)acrylate" means acrylate and methacrylate; "(meth)acrylic" means acrylic and methacrylic; "(meth)acryloyl" means acryloyl and methacryloyl. In the invention, monomer is differentiated from oligomer and polymer, and the monomer indicates a compound having a weight-average molecular weight of at most 1,000. In this specification, "functional group" means a group participating in polymerization.

"Imprint" referred to in the invention is meant to indicate pattern transfer in a size of from 1 nm to 10 mm and preferably meant to indicate pattern transfer in a size of from about 10 nm to 100 μm (nanoimprint).

Regarding the expression of "group (atomic group)" in this specification, the expression with no indication of "substituted" or "unsubstituted" includes both "substituted group" and "unsubstituted group". For example, "alkyl group" includes not only an alkyl group not having a substituent (unsubstituted alkyl group) but also an alkyl group having a substituent (substituted alkyl group).

[Curable Composition for Imprints]

The curable composition for imprints of the invention (which may be hereinafter simply referred to as the "composition of the invention") is a curable composition for imprints, which comprises one or more polymerizable monomers and a photopolymerization initiator, wherein the curable composition for imprints comprises at least one polymerizable monomer (Ax) represented by the following formula (I) as the polymerizable monomer, and wherein the total content of the polymerizable monomer which is solid at 25° C. and the polymerizable monomer having a viscosity at 25° C. of 70 mPa·s or more is less than 50% by mass of all the polymerizable monomers contained in the curable composition for imprints. The curable composition for imprints satisfies at least one of the following (A) and (B):

(A) the content of the polymerizable monomer (Ax) represented by the formula (I) in the curable composition for imprints is 45% by mass or more, relative to all the polymerizable monomers contained in the composition, and (B) the total content of polymerizable monomers which are solid at 25° C. and polymerizable monomers having a viscosity at 25° C. of 70 mPa·s or more in the curable composition for imprints is less than 50% by mass, relative to all the polymerizable monomers contained in the composition.

The curable composition for imprints may satisfy either one of (A) and (B). The curable composition for imprints preferably satisfies both (A) and (B) because its high-aspect patternability is further improved.

In addition, generally, the curable composition used in the photoimprint method is constituted comprising a polymerizable monomer having a polymerizable functional group, and a photopolymerization initiator that initiates the polymerization reaction of the polymerizable monomer through photoirradiation, and optionally comprising a solvent, a surfactant, an antioxidant, or the like. When a (meth)acrylate is used as the polymerizable monomer, an acrylate is more preferable than an methacrylate.

Hereinafter, the compositions of the invention are described in order.

(Polymerizable Monomer)

—Polymerizable Monomer (Ax)—

The polymerizable monomer (Ax) is represented by the following formula (I):

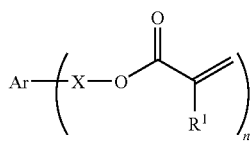

(I)

wherein Ar represents a divalent or trivalent aromatic group which may have a substituent, X represents a single bond or an organic linking group, $R^1$ represents a hydrogen atom or an alkyl group which may have a substituent, and n represents 2 or 3.

In the formula (I), when n is 2, Ar represents a divalent aromatic group (i.e. an arylene group). When n is 3, At represents a trivalent aromatic group. Examples of the arylene group include a hydrocarbon-based arylene group such as a phenylene group, a naphthylene group, and the like; a heteroarylene group having an indole, carbazole, or the like as a linking group, and the like, preferably a hydrocarbon-based arylene group, and more preferably a phenylene group, from the viewpoint of the viscosity and the etching resistance. The arylene group may have a substituent, and examples of the preferable substituent include an alkyl group, an alkoxy group, a hydroxyl group, a cyano group, an alkoxycarbonyl group, an amide group, and a sulfonamide group.

Examples of the organic linking group of the X include an alkylene group, an arylene group, and an aralkylene group, which may have a hetero atom in the chain. Among these, an alkylene group and an oxyalkylene group are preferred, and an alkylene group is more preferred. As the X, a single bond or an alkylene group is particularly preferred.

The $R^1$ is a hydrogen atom or an alkyl group which may have a substituent. $R^1$ is preferably a hydrogen atom or a methyl group, more preferably a hydrogen atom. When $R^1$ has a substituent, the kind of the substituent is not particularly limited. Preferable substituents are a hydroxyl group, a halogen atom, an alkoxy group, an acyloxy group and others.

n is 2 or 3, and preferably 2.

The polymerizable monomer (Ax) is preferably a polymerizable monomer represented by the following formula (I-a) or (I-b) from the viewpoint of lowering the viscosity of the composition.

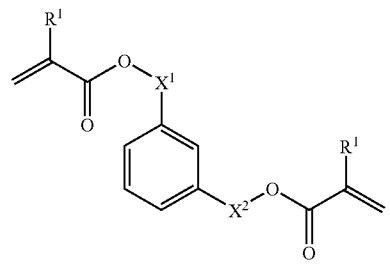

Formula (I-a)

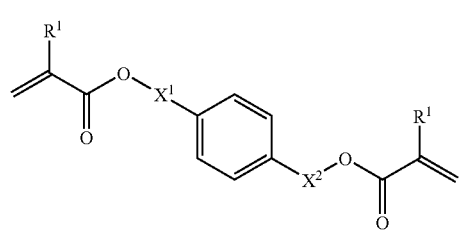

Formula (I-b)

wherein $X^1$ and $X^2$ each independently represent a single bond or an alkylene group optionally having a substituent having 1 to 3 carbon atoms, and $R^1$ represents a hydrogen atom or an alkyl group which may have a substituent.

In the formula (I-a), the $X^1$ is preferably a single bond or a methylene group, and more preferably a methylene group from the viewpoint of lowering the viscosity.

The preferable range of the $X^2$ is the same as the preferable range of the $X^1$.

The $R^1$ has the same meaning as the $R^1$ of the formula (I), and the preferable range is also the same.

If the polymerizable monomer (Ax) is liquid at 25° C., it is favorable since the generation of the foreign bodies can be inhibited even when the amount to be added is increased.

The polymerizable monomer (Ax) preferably has a viscosity at 25° C. of less than 70 mPa·s, more preferably 50 mPa·s or less, particularly preferably 30 mPa·s or less in view of patternability.

Specific examples of the preferable polymerizable monomer (Ax) are as follows. $R^1$ has the same meaning as the $R^1$ of the formula (I), and represents a hydrogen atom or an alkyl group which may have a substituent. $R^1$ is preferably a hydrogen atom in view of curability. The invention is not limited to these specific examples.

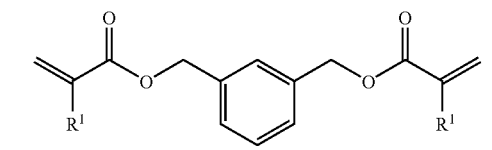

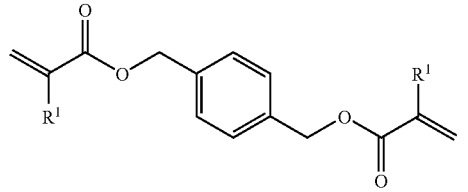

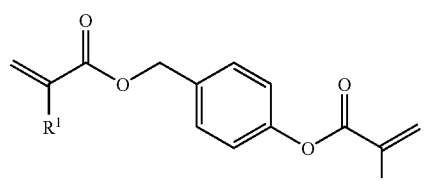

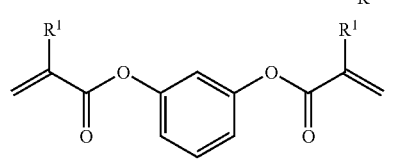

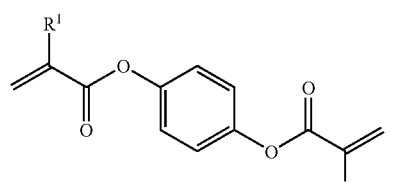

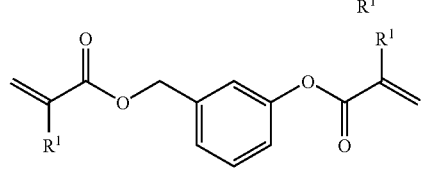

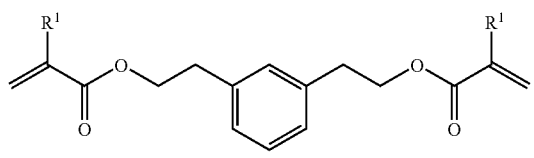

-continued

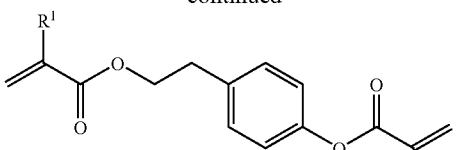

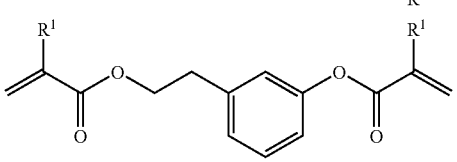

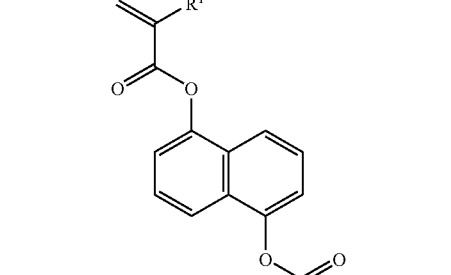

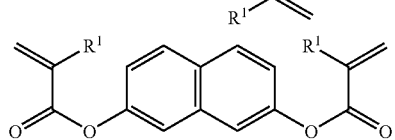

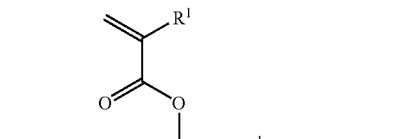

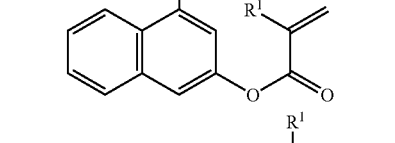

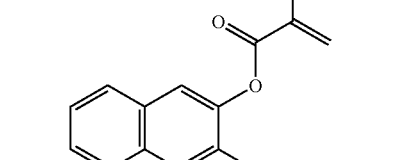

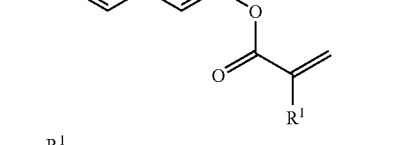

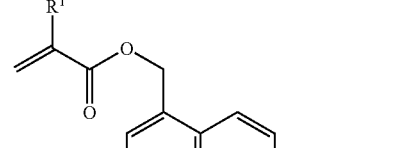

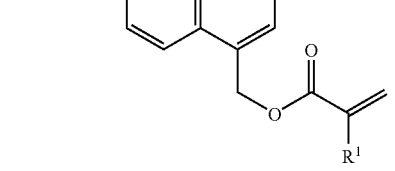

-continued

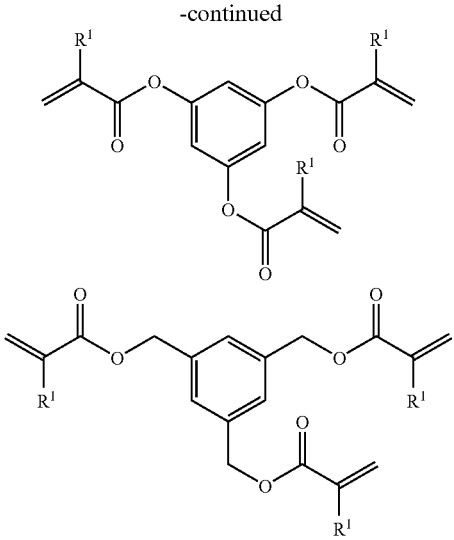

Among these exemplified compounds, the following compounds are particularly preferable because they are liquid at 25° C. with a low viscosity and show an excellent curability.

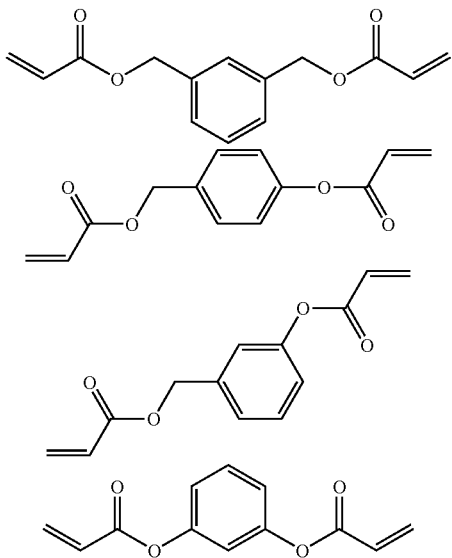

The curable composition for imprints of the invention satisfies at least one of the following (A) and (B):

(A) the content of the polymerizable monomer (Ax) represented by the formula (I) in the curable composition for imprints is 45% by mass or more, relative to all the polymerizable monomers contained in the composition, and (B) the total content of polymerizable monomers which are solid at 25° C. and polymerizable monomers having a viscosity at 25° C. of 70 mPa·s or more in the curable composition for imprints is less than 50% by mass, relative to all the polymerizable monomers contained in the composition.

When the curable composition for imprints of the invention satisfies (A) above, the content of the polymerizable monomer (Ax) is preferably 45% by mass or more, preferably more than 50% by mass, more preferably 70% by mass or more, most preferably 80% by mass or more, relative to all the polymerizable monomers contained in the composition in view of improved stability over time. It is particularly preferable that the polymerizable monomer (Ax) is liquid at 25° C. and contained in an amount satisfying (A) above. Such composition is excellent in patternability as well as stability over time and dry etching resistance.

When the polymerizable monomer (Ax) is solid at 25° C. or has a viscosity at 25° C. of 70 mPa·s or more and the polymerizable monomer (Ax) is contained in an amount satisfying (A) above, the content of the polymerizable monomer (Ax) is preferably 45 to 70% by mass, more preferably more than 50% and at most 70% by mass, particularly preferably 55 to 65% by mass, relative to all the polymerizable monomers contained in the composition in view of improved stability over time.

When the curable composition for imprints satisfies (A) above, it is also preferable that the curable composition also satisfies (B) above.

When the curable composition for imprints satisfies (B) above, the content of the polymerizable monomer (Ax) in the curable composition for imprints is not particularly limited as long as the total content of the polymerizable monomer which is solid at 25° C. and the polymerizable monomer having a viscosity at 25° C. of 70 mPa·s or more is less than 50% by mass relative to all the polymerizable monomers contained in the curable composition for imprints. From the viewpoint of the curability and the viscosity of the composition, the content of the polymerizable monomer (Ax) is preferably from 1 to 100% by mass, more preferably from 10 to 100% by mass, and particularly preferably from 20 to 100% by mass, relative to all the components excluding the solvent.

When the curable composition for imprints satisfies (B) above and the polymerizable monomer (Ax) is a compound having two polymerizable functional groups, the content of the polymerizable monomer (Ax) in the curable composition is preferably from 1 to 100% by mass, more preferably from 20 to 100% by mass, and even more preferably more than 50 to 100% by mass, relative to all the polymerizable monomers contained in the composition.

Further, When the curable composition for imprints satisfies (B) above and the polymerizable monomer (Ax) is a compound having three polymerizable functional groups, the content of the polymerizable monomer (Ax) in the curable composition is preferably from 1 to 80% by mass, more preferably from 1 to 70% by mass, and even more preferably from 10 to 60% by mass, relative to all the polymerizable monomers contained in the composition.

In the curable composition for imprints of the invention, it is preferable to optionally use other polymerizable monomers different from the polymerizable monomer (Ax) as described below in combination with the polymerizable monomer (Ax), for the improvement of the viscosity of the composition, the dry etching resistance, the imprint aptitude, the curability, and the like.

—Other Polymerizable Monomers—

As described in the above, the curable composition for imprints of the invention may further comprise other polymerizable monomers different from the polymerizable monomer (Ax) for the purpose of improving the viscosity of the composition, the dry etching resistance, the imprint aptitude, the curability, and the like. The other polymerizable monomers include, for example, a polymerizable unsaturated monomer having from 1 to 6 ethylenic unsaturated bond-having groups; a compound having an oxirane ring (epoxy compound); a vinyl ether compound; a styrene derivative; a fluorine atom-having compound; propenyl ether or butenyl ether; and the like. From the viewpoint of the curability, a polymerizable unsaturated monomer having from 1 to 6 ethylenic unsaturated bond-having groups is preferred.

The polymerizable unsaturated monomer having from 1 to 6 ethylenic unsaturated bond-having groups (mono- to hexafunctional polymerizable unsaturated monomer) is described below.

The polymerizable unsaturated monomer having one ethylenic unsaturated bond-having group (mono-functional polymerizable unsaturated monomer) includes concretely 2-acryloyloxyethyl phthalate, 2-acryloyloxy-2-hydroxyethyl phthalate, 2-acryloyloxyethyl hexahydrophthalate, 2-acryloyloxypropyl phthalate, 2-ethyl-2-butylpropanediol acrylate, 2-ethylhexyl(meth)acrylate, 2-ethylhexylcarbitol(meth)acrylate, 2-hydroxybutyl(meth)acrylate, 2-hydroxyethyl(meth)acrylate, 2-hydroxypropyl(meth)acrylate, 2-methoxyethyl(meth)acrylate, 3-methoxybutyl(meth)acrylate, 4-hydroxybutyl(meth)acrylate, acrylic acid dimer, benzyl(meth)acrylate, 1- or 2-naphthyl(meta)acrylate, butanediol mono(meth)acrylate, butoxyethyl(meth)acrylate, butyl(meth)acrylate, cetyl(meth)acrylate, ethyleneoxide-modified (hereinafter this may be referred to as "EO") cresol(meth)acrylate, dipropylene glycol(meth)acrylate, ethoxylated phenyl(meth)acrylate, ethyl(meth)acrylate, isoamyl(meth)acrylate, isobutyl(meth)acrylate, isooctyl(meth)acrylate, cyclohexyl(meth)acrylate, isobornyl(meth)acrylate, dicyclopentanyl(meth)acrylate, dicyclopentanyloxyethyl(meth)acrylate, isomyristyl(meth)acrylate, lauryl(meth)acrylate, methoxydiproylene glycol(meth)acrylate, methoxytripropylene glycol(meth)acrylate, methoxypolyethylene glycol(meth)acrylate, methoxytriethylene glycol(meth)acrylate, methyl(meth)acrylate, neopentyl glycol benzoate(meth)acrylate, nonylphenoxypolyethylene glycol(meth)acrylate, nonylphenoxypolypropylene glycol(meth)acrylate, octyl(meth)acrylate, paracumylphenoxyethylene glycol(meth)acrylate, epichlorohydrin (hereinafter referred to as "ECH")-modified phenoxyacrylate, phenoxyethyl(meth)acrylate, phenoxydiethylene glycol(meth)acrylate, phenoxyhexaethylene glycol(meth)acrylate, phenoxytetraethylene glycol(meth)acrylate, polyethylene glycol(meth)acrylate, polyethylene glycol-polypropylene glycol(meth)acrylate, polypropylene glycol(meth)acrylate, stearyl(meth)acrylate, EO-modified succinic acid(meth)acrylate, tert-butyl(meth)acrylate, tribromophenyl(meth)acrylate, EO-modified tribromophenyl(meth)acrylate, tridodecyl(meth)acrylate, p-isopropenylphenol, styrene, α-methylstyrene, acrylonitrile.

Among the monofunctional (meth)acrylate compounds, preferred are monofunctional (meth)acrylate compounds having an aromatic structure and/or alicyclic hydrocarbon structure in view of dry etching resistance. Among the monofunctional (meth)acrylate compounds having an aromatic structure and/or alicyclic hydrocarbon structure, preferred are benzyl(meth)acrylate, 1- or 2-naphthyl(meta)acrylate, 1- or 2-naphthylmethyl(meth)acrylate, dicyclopentanyl(meth)acrylate, dicyclopentanyloxyethyl(meth)acrylate, isobornyl(meth)acrylate, adamantyl(meth)acrylate. Particularly preferred are benzyl(meth)acrylate, 1- or 2-naphthyl(meta)acrylate and 1- or 2-naphthylmethyl(meth)acrylate.

As the other polymerizable monomer, also preferred is a polyfunctional polymerizable unsaturated monomer having two ethylenic unsaturated bond-containing groups.

Preferred examples of the difunctional polymerizable unsaturated monomer having two ethylenic unsaturated bond-containing groups for use in the invention include diethylene glycol monoethyl ether(meth)acrylate, dimethylol-dicyclopentane di(meth)acrylate, di(meth)acrylated isocyanurate, 1,3-butylene glycol di(meth)acrylate, 1,4-butanediol di(meth)acrylate, EO-modified 1,6-hexanediol di(meth)acrylate, ECH-modified 1,6-hexanediol di(meth)acrylate, allyloxy-polyethylene glycol acrylate, 1,9-nonanediol di(meth)acrylate, EO-modified bisphenol A di(meth)acrylate, PO-modified bisphenol A di(meth)acrylate, modified bisphenol A di(meth)acrylate, EO-modified bisphenol F di(meth)acrylate, ECH-modified hexahydrophthalic acid diacrylate, hydroxypivalic acid neopentyl glycol di(meth)acrylate, neopentyl glycol di(meth)acrylate, EO-modified neopentyl glycol diacrylate, propyleneoxide (hereinafter referred to as "PO")-modified neopentyl glycol diacrylate, caprolactone-modified hydroxypivalate neopentyl glycol, stearic acid-modified pentaerythritol di(meth)acrylate, ECH-modified phthalic acid di(meth)acrylate, poly(ethylene glycol-tetramethylene glycol)di(meth)acrylate, poly(propylene glycol-tetramethylene glycol)di(meth)acrylate, polyester(di)acrylate, polyethylene glycol di(meth)acrylate, polypropylene glycol di(meth)acrylate, ECH-modified propylene glycol di(meth)acrylate, silicone di(meth)acrylate, triethylene glycol di(meth)acrylate, tetraethylene glycol di(meth)acrylate, dimethyloltricyclodecane di(meth)acrylate, neopentyl glycol-modified trimethylolpropane di(meth)acrylate, tripropylene glycol di(meth)acrylate, EO-modified tripropylene glycol di(meth)acrylate, triglycerol di(meth)acrylate, dipropylene glycol di(meth)acrylate, divinylethylene-urea, divinylpropylene-urea.

Of those, especially preferred for use in the invention are difunctional (meth)acrylates such as neopentyl glycol di(meth)acrylate, 1,9-nonanediol di(meth)acrylate, tripropylene glycol di(meth)acrylate, tetraethylene glycol di(meth)acrylate, hydroxypivalate neopentyl glycol di(meth)acrylate, polyethylene glycol di(meth)acrylate.

Examples of the polyfunctional polymerizable unsaturated monomer having at least three ethylenic unsaturated bond-having groups include ECH-modified glycerol tri(meth)acrylate, EO-modified glycerol tri(meth)acrylate, PO-modified glycerol tri(meth)acrylate, pentaerythritol triacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, caprolactone-modified dipentaerythritol hexa(meth)acrylate, dipentaerythritol hydroxy-penta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritol ethoxy-tetra(meth)acrylate, pentaerythritol tetra(meth)acrylate, etc.

Of those, especially preferred for use in the invention are EO-modified glycerol tri(meth)acrylate, PO-modified glycerol tri(meth)acrylate, trimethylolpropane tri(meth)acrylate, EO-modified trimethylolpropane tri(meth)acrylate, PO-modified trimethylolpropane tri(meth)acrylate, dipentaerythritol hexa(meth)acrylate, pentaerythritol ethoxy-tetra(meth)acrylate, and pentaerythritol tetra(meth)acrylate.

The oxirane ring-having compound (epoxy compound) includes, for example, polyglycidyl esters of polybasic acids, polyglycidyl ethers of polyalcohols, polyglycidyl ethers of polyoxyalkylene glycols, polyglycidyl ethers of aromatic polyols, hydrogenated polyglycidyl ethers of aromatic polyols, urethane-polyepoxy compounds, epoxidated polybutadienes, etc. One or more of these compounds may be used either singly or as combined.

Examples of the oxirane ring-having compound (epoxy compound) preferred for use in the invention include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, hydrogenated bisphenol A diglycidyl ether, hydrogenated bisphenol F diglycidyl ether, hydrogenated bisphenol S diglycidyl ether, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ether; polyglycidyl ethers of polyether polyols produced by adding one or more alkylene oxides to aliphatic polyalcohol such as ethylene glycol, propylene glycol, glycerin or the like; diglycidyl esters of aliphatic long-chain dibasic acids; monoglycidyl ethers of aliphatic higher alcohols; monoglycidyl ethers of polyether alcohols produced by adding alkyleneoxide to phenol, cresol, butylphenol or the like; glycidyl esters of higher fatty acids, etc.

Of those, especially preferred are bisphenol A diglycidyl ether, bisphenol F diglycidyl ether, hydrogenated bisphenol A diglycidyl ether, hydrogenated bisphenol F diglycidyl ether, 1,4-butanediol diglycidyl ether, 1,6-hexanediol diglycidyl ether, glycerin triglycidyl ether, trimethylolpropane triglycidyl ether, neopentyl glycol diglycidyl ether, polyethylene glycol diglycidyl ether, polypropylene glycol diglycidyl ether.

Commercial products favorable for use herein as the glycidyl group-having compound are UVR-6216 (by Union Carbide), Glycidol, AOEX24, Cyclomer A200 (all by Daicel Chemical Industry), Epikote 828, Epikote 812, Epikote 1031, Epikote 872, Epikote CT508 (all by Yuka Shell), KRM-2400, KRM-2410, KRM-2408, KRM-2490, KRM-2720, KRM-2750 (all by Asahi Denka Kogyo), etc. One or more of these may be used either singly or as combined.

The production method for the oxirane ring-having compounds is not specifically defined. For example, the compounds may be produced with reference to publications of Lecture of Experimental Chemistry 20, 4th Ed., Organic Synthesis II, p. 213, ff. (Maruzen, 1992); The chemistry of heterocyclic compounds—Small Ring Heterocycles, Part 3, Oxiranes (edited by Alfred Hasfner, John & Wiley and Sons, An Interscience Publication, New York, 1985); Yoshimura, Adhesive, Vol. 29, No. 12, 32, 1985; Yoshimura, Adhesive, Vol. 30, No. 5, 42, 1986; Yoshimura, Adhesive, Vol. 30, No. 7, 42, 1986; JP-A-11-100378, Japanese Patents 2906245 and 2926262.

As the other polymerizable monomer for use in the invention, vinyl ether compounds may be in the curable composition.

Any known vinyl ether compounds are usable, including, for example, 2-ethylhexyl vinyl ether, butanediol 1,4-divinyl ether, diethylene glycol monovinyl ether, ethylene glycol divinyl ether, triethylene glycol divinyl ether, 1,2-propanediol divinyl ether, 1,3-propanediol divinyl ether, 1,3-butanediol divinyl ether, 1,4-butanediol divinyl ether, tetramethylene glycol divinyl ether, neopentyl glycol divinyl ether, trimethylolpropane trivinyl ether, trimethylolethane trivinyl ether, hexanediol divinyl ether, tetraethylene glycol divinyl ether, pentaerythritol divinyl ether, pentaerythritol trivinyl ether, pentaerythritol tetravinyl ether, sorbitol tetravinyl ether, sorbitol pentavinyl ether, ethylene glycol diethylene vinyl ether, triethylene glycol diethylene vinyl ether, ethylene glycol dipropylene vinyl ether, triethylene glycol diethylene vinyl ether, trimethylolpropane triethylene vinyl ether, trimethylolpropane diethylene vinyl ether, pentaerythritol diethylene vinyl ether, pentaerythritol triethylene vinyl ether, pentaerythritol tetraethylene vinyl ether, 1,1,1-tris[4-(2-vinyloxyethoxy)phenyl]ethane, bisphenol A divinyloxyethyl ether, etc.

These vinyl ether compounds can be produced, for example, according to the method described in Stephen. C. Lapin, Polymers Paint Colour Journal, 179 (4237), 321 (1988), concretely through reaction of a polyalcohol or a polyphenol with acetylene, or through reaction of a polyalcohol or a polyphenol with a halogenoalkyl vinyl ether. One or more of these compounds may be used either singly or as combined.

As the other polymerizable monomer for use in the invention, styrene derivatives may also be employed. The styrene derivatives include, for example, styrene, p-methylstyrene, p-methoxystyrene, β-methylstyrene, p-methyl-β-methylstyrene, α-methylstyrene, p-methoxy-β-methylstyrene, p-hydroxystyrene, etc.

For the purpose of enhancing the releasability from mold and the coatability of the curable composition, a fluorine atom-having compound may be incorporated into the curable composition. The compound includes, for example, trifluoromethyl(meth)acrylate, pentafluoroethyl(meth)acrylate, (perfluorobutyl)ethyl(meth)acrylate, perfluorobutyl-hydroxypropyl(meth)acrylate, (perfluorohexyl)ethyl(meth)acrylate, octafluoropentyl(meth)acrylate, perfluorooctylethyl(meth) acrylate, tetrafluoropropyl(meth)acrylate, etc.

As the other polymerizable monomer for use in the invention, propenyl ethers and butenyl ethers may also be employed. Preferred examples of the propenyl ethers and butenyl ethers include, for example, 1-dodecyl-1-propenyl ether, 1-dodecyl-1-butenyl ether, 1-butenoxymethyl-2-norbornene, 1,4-di(1-butenoxy)butane, 1,10-di(1-butenoxy)decane, 1,4-di(1-butenoxymethyl)cyclohexane, diethylene glycol di(1-butenyl) ether, 1,2,3-tri(1-butenoxy)propane, propenyl ether propylene carbonate, etc.

The content of the other polymerizable monomer as described above is not particularly limited as long as the total content of the polymerizable monomer which is solid at 25° C. and the polymerizable monomer having a viscosity at 25° C. of 70 mPa·s or more is less than 50% by mass of all the polymerizable monomers contained in the curable composition for imprints. The preferred content of the other polymerizable monomer varies depending on the content of the polymerizable monomer (Ax) in the invention and which of (A) and (B) is satisfied, but for example, it may be from 0 to 90% by mass, preferably from 5 to 80% by mass, and more preferably from 20 to 80% by mass of all the polymerizable monomers of the invention.

Next, the preferred blend embodiments of the polymerizable monomer (Ax) and the other polymerizable monomer in the invention are described below.

A monofunctional polymerizable monomer is generally used as a reactive diluent, and has an effect of lowering the viscosity of the curable composition for imprints of the invention, and it is preferably added in an amount of at least 15% by mass, more preferably from 20 to 90% by mass, even more preferably from 25 to 85% by mass, and particularly preferably from 30 to 80% by mass, relative to the total amount of the polymerizable monomers.

A monomer having two polymerizable reactive groups (difunctional polymerizable monomer) is preferably added in an amount of at most 90% by mass, more preferably at most 80% by mass, and particularly preferably at most 70% by mass, of all the polymerizable monomers.

The proportion of the monofunctional and difunctional polymerizable monomers to be added is preferably from 10 to 100% by mass, more preferably from 30 to 95% by mass, and particularly preferably from 50 to 90% by mass, of all the polymerizable monomers.

The proportion of the polyfunctional polymerizable monomer having three or more unsaturated bond-having groups to be added is preferably at most 80% by mass, more preferably at most 60% by mass, and particularly preferably at most 40% by mass, of all the polymerizable monomers. When the proportion of the polymerizable monomer having three or more polymerizable reactive groups is at most 80% by mass, it is favorable since the viscosity of the composition may be lowered.

(Viscosity of Polymerizable Compound)

When the curable composition of the invention satisfies (B) above, the polymerizable monomer comprises the polymerizable monomer (Ax) and, optionally, the other polymerizable monomer as described above, and that the content of the polymerizable monomer which is solid at 25° C. or the polymerizable monomer having a viscosity at 25° C. of 70 mPa·s or more is less than 50% by mass relative to the all the polymerizable monomers contained in the composition.

By lowering the content of the polymerizable monomer which is solid at 25° C., the generation of the foreign bodies over time can be inhibited, whereby the defects at a time of imprint can be reduced. The preferable content of the polymerizable monomer which is solid at 25° C. is less than 40% by mass, more preferably less than 20% by mass, and even more preferably less than 10% by mass, relative to all the polymerizable monomers. In addition to adding an extremely small amount of the solid polymerizable monomer, it is preferable that a solid polymerizable monomer is not substantially contained.

Furthermore, by lowering the content of the polymerizable monomer having a viscosity at 25° C. of 70 mPa·s or more, the change in the viscosity over time can be inhibited, whereby the change in the patternability can be reduced even when the composition is left over time.

The preferable content of the polymerizable monomer having a viscosity at 25° C. of 70 mPa·s or more is less than 40% by mass, more preferably less than 20% by mass, and particularly preferably less than 10% by mass, relative to all the polymerizable monomers. In addition to adding an extremely small amount of the high viscosity polymerizable monomer, it is preferable that a high viscosity polymerizable monomer is not substantially contained.

In a more preferable embodiment, the content of the compound having a viscosity at 25° C. of 60 mPa·s or more is less than 50% by mass, and even more preferably the content of the compound having a viscosity at 25° C. of 40 mPa·s or more is less than 50% by mass, relative to all the polymerizable monomers.

In a particularly preferable embodiment, the total content of the polymerizable monomer which is solid at 25° C. and the polymerizable monomer having a viscosity at 25° C. of 70 mPa·s or more is preferably less than 50% by mass, more preferably less than 30% by mass, and even more preferably less than 10% by mass, relative to all the polymerizable monomers.

When the curable composition for imprints comprises a polymerizable monomer having a viscosity at 25° C. of 70 mPa·s or more, the viscosity of the polymerizable monomer is preferably 70 to 2000 mPa·s, more preferably 70 to 1000 mPa·s, particularly preferably 70 to 500 mPa·s. When the curable composition for imprints comprises a polymerizable monomer having a viscosity at 25° C. of 70 mPa·s or more, polymerizable monomers having a smaller viscosity are preferably used.

It is preferable that 80% by mass or more of all the polymerizable monomers contained in the curable composition for imprints is a polymerizable monomer which is liquid at 25° C. from the viewpoint of further improving the low-temperature storability of the composition of the invention, it is more preferable that 90% by mass or more of all the polymerizable monomers is a polymerizable monomer which is liquid at 25° C., and it is particularly preferable that 95% by mass or more of all the polymerizable monomers is a polymerizable monomer which is liquid at 25° C.

(Photopolymerization Initiator)

The curable composition for imprints of the invention comprises a photopolymerization initiator. As the photopolymerization initiator in the invention, usable is any compound capable of generating an active radical for polymerization of the above-mentioned polymerizable monomer through photoirradiation. As the photopolymerization initiator, preferred are radical polymerization initiators. In the invention, two or more different types of photopolymerization initiators may be used, as combined.

The content of the photopolymerization initiator may be, for example, from 0.01 to 15% by mass of all the components constituting the curable composition except solvent, preferably from 0.1 to 12% by mass, more preferably from 0.2 to 7% by mass. In case where two or more different types of photopolymerization initiators are used, the total amount thereof falls within the above range.

When the content of the photopolymerization initiator is at least 0.01% by mass, then it is favorable since the sensitivity (rapid curability), the power of resolution, the line edge accuracy and the coating film strength of the curable composition tend to be better. On the other hand, when the content of the photopolymerization initiator is at most 15% by mass, it is also favorable since the light transmittance, the discoloration resistance and the handlability of the curable composition tend to be better. Heretofore, inkjet compositions and compositions for liquid-crystal display color filters containing dye and/or pigments have been variously investigated in point of the preferred amount of the photopolymerization initiator and/or the photoacid generator to be in the curable compositions; however, there is no report relating to the preferred amount of the photopolymerization initiator and/or the photoacid generator to be added to photocurable compositions for imprints. In this connection, in the systems containing dye and/or pigment, the dye and/or the pigment may act as a radical-trapping agent and may have some influence on the photopolymerization and the sensitivity of the compositions. Taking this into consideration, the amount of the photopolymerization initiator to be added to these applications is optimized. On the other hand, in the curable composition for imprints of the invention, dye and/or pigment are not indispensable ingredients, and the optimum range of the photopolymerization initiator in the composition may differ from that in the field of inkjet compositions and compositions for liquid-crystal display color filters.

As the radical photopolymerization initiator for use in the invention, preferred are acylphosphine compounds and oxime ester compounds from the viewpoint of the curing sensitivity and the absorption characteristics of the composition. As the photopolymerization initiator, for example, commercial products may be used. Their examples are Irgacure® 2959 (1-[4-(2-hydroxyethoxy)phenyl]-2-hydroxy-2-methyl-1-propan-1-one), Irgacure® 184 (1-hydroxycyclohexyl phenyl ketone), Irgacure® 500 (1-hydroxycyclohexyl phenyl ketone, benzophenone), Irgacure® 651 (2,2-dimethoxy-1,2-diphenylethan-1-one), Irgacure® 369 (2-benzyl-2-dimethylamino-1-(4-morpholinophenyl)butanone-1), Irgacure® 907 (2-methyl-1[4-methylthiophenyl]-2-morpholinopropan-1-one), Irgacure® 819 (bis(2,4,6-trimethylbenzoyl)-phenylphosphine oxide), Irgacure® 1800 (bis(2,6-dimethoxybenzoyl)-2,4,4-trimethylpentylphosphine oxide, 1-hydroxycyclohexyl phenyl ketone), Irgacure® 1800 (bis(2,6-dimethoxybenzoyl)-2,4,4-trimethylpentylphosphine oxide, 2-hydroxy-2-methyl-1-phenyl-1-propan-1-one), Irgacure® OXE01 (1,2-octanedione, 1-[4-(phenylthio)phenyl]-2-(O-benzoyloxime)), Darocur® 1173 (2-hydroxy-2-methyl-1-phenyl-1-propan-1-one), Darocur® 1116, 1398, 1174 and 1020, CGI242 (ethanone, 1-[9-ethyl-6-(2-methylbenzoyl)-9H-carbazol-3-yl]-1-(O-acetyloxime)), which are all available from Ciba; Lucirin TPO (2,4,6-trimethylbenzoyl-diphenylphosphine oxide), Lucirin TPO-L (2,4,6-trimethylbenzoylphenylethoxyphosphine oxide) which are both available from BASF; Esacure 1001M (1-[4-benzoylphenylsulfanyl]phenyl)-2-methyl-2-(4-methylphenylsulfonyl)propan-1-one available from Nihon SiberHegner; Adeka Optomer® N-1414 (carbazole/phenone compound), Adeka Optomer® N-1717 (acridine compound), Adeka Optomer® N-1606 (triazine compound), all available from Asahi Denka; Sanwa Chemical's TFE-triazine (2-[2-(furan-2-yl)vinyl]-4,6-bis(trichloromethyl)-1,3,5-tri azine), Sanwa Chemical's TME-triazine (2-[2-(5-methylfuran-2-yl)vinyl]-4,6-bis(trichloromethyl)-1,3,5-triazine), Sanwa Chemical's MP-triazine (2-(4-methoxyphenyl)-4,6-bis (trichloromethyl)-1,3,5-triazin e); Midori Chemical's TAZ-113 (2-[2-(3,4-dimethoxyphenyl)ethenyl]-4,6-bis(trichloromethyl)-1,3,5-triazine), Midori Chemical's TAZ-108 (2-(3,4-dimethoxyphenyl)-4,6-bis(trichloromethyl)-1,3,5-tri azine; as well as benzophenone, 4,4'-bisdiethylaminobenzophenone, methyl-2-benzophenone, 4-benzoyl-4'-methyl-diphenyl sulfide, 4-phenylbenzophenone, ethyl Michler's ketone, 2-chlorothioxanthone, 2-methylthioxanthone, 2-isopropylthioxanthone, 4-isopropylthioxanthone, 2,4-diethylthioxanthone, 1-chloro-4-propoxythioxanthone, 2-methylthioxanthone, thioxanthone ammonium salt, benzoin, 4,4'-dimethoxybenzoin, benzoin methyl ether, benzoin ethyl ether, benzoin isopropyl ether, benzoin isobutyl ether, benzyl dimethyl ketal, 1,1,1-trichloroacetophenone, diethoxyacetophenone, dibenzosuberone, methyl o-benzoylbenzoate, 2-benzoylnaphthalene, 4-benzoylbiphenyl, 4-benzoyldiphenyl ether, 1,4-benzoylbenzene, benzil, 10-butyl-2-chloroacridone, [4-(methylphenylthio)phenyl]phenylmethane), 2-ethylanthraquinone, 2,2-bis(2-chlorophenyl)-4,5,4',5'-tetrakis(3,4,5-trimethoxy phenyl)-1,2'-biimidazole, 2,2-bis(o-chlorophenyl)-4,5,4',5'-tetraphenyl-1,2'-biimidazole, tris(4-dimethylaminophenyl)methane, ethyl 4-(dimethylamino) benzoate, 2-(dimethylamino)ethyl benzoate, butoxyethyl 4-(dimethylamino)benzoate, etc.

In the invention, "light" includes not only those having with a wavelength falling within a range of ultraviolet, near-ultraviolet, far-ultraviolet, visible, infrared, and electromagnetic waves but also radiations. The radiations include, for example, microwaves, electron beams, EUV, X-rays. In addition, laser rays such as 248 nm excimer laser, 193 nm excimer laser, 172 nm excimer laser are also usable herein. These lights may be monochromatic lights (single wavelength lights) having passed through optical filters, or may be lights of different wavelengths (composite lights). For photoexposure, multiple photoexposure may be employable, and for the purpose of enhancing the film strength and the etching resistance of the composition, entire surface photoexposure may be effected after pattern formation.

The photopolymerization initiator in the invention must be suitably selected depending on the wavelength of the light source used; and preferred are those not generating gas during mold compression and photoexposure. Gas generation, if any, may cause mold contamination, therefore giving problems in that the mold must be washed frequently and the photocurable composition may be deformed in the mold and the transferred pattern accuracy may be thereby worsened.

The curable composition for imprints of the invention is preferably a radical-polymerizable composition, in which the polymerizable monomer (A) is a radical-polymerizable monomer and the photopolymerization initiator (B) is a radical polymerization initiator that generates a radical through photoirradiation.

(Other Ingredients)

In addition to the above-mentioned polymerizable monomer and the photopolymerization initiator, the curable composition for imprints of the invention may contain any other ingredients such as surfactant, antioxidant, solvent, polymer and others for various purposes not detracting from the effect of the invention. Preferably, the curable composition for imprints of the invention contain at least one selected from fluorine-containing surfactant, silicone-type surfactant, fluorine-containing silicone-type surfactant, and antioxidant.

—Surfactant—

Preferably, the curable composition for imprints of the invention contains a surfactant. The content of the surfactant that may be in the composition may be, for example, from 0.001 to 5% by mass of the composition, preferably from 0.002 to 4% by mass, more preferably from 0.005 to 3% by mass. In case where two or more different types of surfactants are in the composition, the total amount thereof falls within the above range. When the surfactant content in the composition falls from 0.001 to 5% by mass, it is favorable from the viewpoint of the coating uniformity, therefore hardly worsening the mold transferability owing to excessive surfactant.

As the surfactant, preferably, the composition contains at least one of a fluorine-containing surfactant, a silicone-type surfactant, a fluorine-containing silicone-type surfactant, more preferably contains both of a fluorine-containing surfactant and a silicone-type surfactant, or contains a fluorine-containing silicone-type surfactant, most preferably contains a fluorine-containing silicone-type surfactant. The fluorine-containing surfactant and the silicone-type surfactant are preferably nonionic surfactants.

"Fluorine-containing silicone-type surfactant" as referred to herein means a surfactant satisfying both the requirement of a fluorine-containing surfactant and that of a silicone-type surfactant.

Using the surfactant of the type may solve the problem of coating failures such as striation and flaky pattern formation (drying unevenness of resist film) that may occur when the curable composition for imprints of the invention is applied onto substrates on which various films are formed, for example, onto silicon wafers in semiconductor production, or onto glass square substrates, chromium films, molybdenum films, molybdenum alloy films, tantalum films, tantalum alloy films, silicon nitride films, amorphous silicon films, tin oxide-doped indium oxide (ITO) films or tin oxide films in production of liquid-crystal devices. In addition, the surfactant is effective for enhancing the flowability of the curable composition of the invention in the cavity of a female mold, for enhancing the mold-resist releasability, for enhancing the resist adhesiveness to substrates, and for lowering the viscosity of the composition. In particular, when the above-mentioned surfactant is added to the curable composition for imprints of the invention, the coating uniformity of the composition can be greatly improved; and in coating with it using a spin coater or a slit scan coater, the composition ensures good coating aptitude irrespective of the size of the substrate to which it is applied.

Examples of the nonionic fluorine-containing surfactant usable in the invention include Fluorad FC-430, FC-431

(Sumitomo 3M's trade names); Surflon S-382 (Asahi Glass's trade name); Eftop EF-122A, 122B, 122CEF-121, EF-126, EF-127, MF-100 (Tochem Products' trade names); PF-636, PF-6320, PF-656, PF-6520 (Omnova Solution's trade names); Futagent FT250, FT251, DFX18 (Neos' trade names); Unidyne DS-401, DS-403, DS-451 (Daikin's trade names); Megafac 171, 172, 173, 178K, 178A, F780F (Dai-Nippon Ink's trade names).

Examples of the nonionic silicone-type surfactant include SI-10 series (Takemoto Yushi's trade name), Megafac Paintad 31 (Dai-Nippon Ink's trade name), KP-341 (Shin-Etsu Chemical's trade name).

Examples of the fluorine-containing silicone-type surfactant include X-70-090, X-70-091, X-70-092, X-70-093 (Shin-Etsu Chemical's trade names); Megafac R-08, XRB-4 (Dai-Nippon Ink's trade names).

—Antioxidant—

Preferably, the curable composition for imprints of the invention contains a known antioxidant. The content of the antioxidant to be in the composition is, for example, from 0.01 to 10% by mass of the total amount of the polymerizable monomers constituting the composition, preferably from 0.2 to 5% by mass. When two or more different types of antioxidants are in the composition, the total amount thereof falls within the above range.

The antioxidant is for preventing fading by heat or photoirradiation, and for preventing fading by various gases such as ozone, active hydrogen NOx, SOx (x is an integer), etc. Especially in the invention, the antioxidant added to the composition brings about the advantage that the cured film is prevented from being discolored and the film thickness is prevented from being reduced through decomposition. The antioxidant includes hydrazides, hindered amine-type antioxidants, nitrogen-containing heterocyclic mercapto compounds, thioether-type antioxidants, hindered phenol-type antioxidants, ascorbic acids, zinc sulfate, thiocyanates, thiourea derivatives, saccharides, nitrites, sulfites, thiosulfates, hydroxylamine derivatives, etc. Of those, preferred are hindered phenol-type antioxidants and thioether-type antioxidants from the viewpoint of their effect of preventing cured film discoloration and preventing film thickness reduction.

Commercial products of the antioxidant usable herein include Irganox 1010, 1035, 1076, 1222 (all by Ciba-Geigy); Antigene P, 3C, FR, Sumilizer S, Sumilizer GA80 (by Sumitomo Chemical); Adekastab AO70, AO80, AO503 (by Adeka), etc. These may be used either singly or as combined.

The curable composition for imprints of the invention preferably comprises at least one of a nonionic surfactant or an antioxidant.

In addition, the composition more preferably comprises at least one from a nonionic fluorine-containing surfactant, a nonionic silicone-type surfactant, a nonionic fluorine-containing silicone-type surfactant, and an antioxidant.

The curable composition for imprints of the invention particularly preferably comprises a nonionic surfactant and an antioxidant. Furthermore, the composition more particularly preferably comprises at least one surfactant selected from a nonionic fluorine-containing surfactant, a nonionic silicone-type surfactant, and a nonionic fluorine-containing silicone-type surfactant, and an antioxidant.

—Polymerization Inhibitor—

Furthermore, the curable composition for imprints of the invention preferably comprises a polymerization inhibitor. The content of the polymerization inhibitor is from 0.001 to 1% by mass, more preferably from 0.005 to 0.5% by mass, and even more preferably from 0.008 to 0.05% by mass, relative to all the polymerizable monomers, and the change in the viscosities over time can be inhibited while maintaining a high curing sensitivity by blending the polymerization inhibitor in an appropriate amount.

—Solvent—

A solvent may be used for the curable composition for imprints of the invention, in accordance with various needs. In particular, when a pattern having a thickness of at most 500 nm is formed, the composition preferably contains a solvent. Preferably, the solvent has a boiling point at normal pressure of from 80 to 200° C. Regarding the type of the solvent, any solvent capable of dissolving the composition may be used. Preferred are solvents having at least any one of an ester structure, a ketone structure, a hydroxyl group and an ether structure. Concretely, the solvent is preferably one or more selected from propylene glycol monomethyl ether acetate, cyclohexanone, 2-heptanone, gamma-butyrolactone, propylene glycol monomethyl ether, ethyl lactate. Most preferred is a solvent containing propylene glycol monomethyl ether acetate as securing coating uniformity.

The content of the solvent in the composition of the invention may be suitably optimized depending on the viscosity of the constitutive ingredients except the solvent, the coatability of the composition and the intended thickness of the film to be formed. From the viewpoint of the coatability, the solvent content is preferably from 0 to 99% by mass of the composition, more preferably from 0 to 97% by mass. In forming a patter having a thickness of at most 500 nm, the solvent content is preferably from 20 to 99% by mass, more preferably from 40 to 99% by mass, even more preferably from 70 to 98% by mass.

—Polymer Ingredient—

The composition of the invention may contain a polyfunctional oligomer having a larger molecular weight than that of the above-mentioned, other polyfunctional monomer within a range capable of attaining the object of the invention, for the purpose of further increasing the crosslinking density of the composition. Examples of the photoradical-polymerizable polyfunctional oligomer include various acrylate oligomers such as polyester acrylates, urethane acrylates, polyether acrylates, epoxy acrylates. The amount of the oligomer ingredient to be added to the composition may be preferably from 0 to 30% by mass of the composition except the solvent therein, more preferably from 0 to 20% by mass, even more preferably from 0 to 10% by mass, most preferably from 0 to 5% by mass.

The curable composition for imprints of the invention may contain any other polymer ingredient for the purpose of enhancing the dry etching resistance, the imprint aptitude and the curability of the composition. The polymer ingredient is preferably a polymer having a polymerizable functional group in the side chain thereof. The weight-average molecular weight of the polymer ingredient is preferably from 2000 to 100000, more preferably from 5000 to 50000, from the viewpoint of the miscibility of the polymer with the polymerizable monomers constituting the composition. The amount of the polymer ingredient to be added may be preferably from 0 to 30% by mass of the composition except the solvent therein, more preferably from 0 to 20% by mass, even more preferably from 0 to 10% by mass, most preferably at most 2% by mass. When the content of the polymer ingredient having a molecular weight of at least 2000 in the composition of the invention is at most 30% by mass of the composition except the solvent therein, then the patternability of the composition is bettered. From the viewpoint of the patternability of the composition, the resin content therein is preferably as small as possible, and except for the surfactant and other minor additives, preferably, the composition does not contain any additional resin ingredient.

In addition to the above-mentioned ingredients, the curable composition for imprints of the invention may contain, if desired, release agent, silane coupling agent, polymerization inhibitor, UV absorbent, light stabilizer, antiaging agent, plasticizer, adhesion promoter, thermal polymerization initiator, colorant, elastomer particles, photoacid enhancer, photobase generator, basic compound, flowability promoter, defoaming agent, dispersant, etc.

The curable composition for imprints of the invention can be produced by mixing the above-mentioned ingredients. After the ingredients are mixed, the resulting mixture may be filtered through a filter having a pore size of from 0.003 μm to 5.0 μm to give a solution. The ingredients may be mixed and dissolved to prepare the curable composition, generally at a temperature falling within a range of from 0° C. to 100° C. The filtration may be effected in plural stages, or may be repeated plural times. The solution once filtered may be again filtered. Not specifically defined, the material of the filter may be any one, for example, polyethylene resin, polypropylene resin, fluororesin, nylon resin, etc.

Preferably, the viscosity of the curable composition for imprints of the invention, except the solvent therein, at 25° C. is from 1 to 100 mPa·s, more preferably from 5 to 50 mPa·s, even more preferably from 7 to 30 mPa·s. Having a viscosity as controlled within a suitable range, the composition may be improved in that the rectangular profile of the pattern to be formed may be bettered and the residual film after patterning may be reduced.

[Patterning Method]

The patterning method (especially micropatterning method) of using the curable composition for imprints of the invention is described below. The patterning method of the invention comprises applying the curable composition for imprints of the invention onto a substrate or a support (base) to form a patterning layer thereon; pressing a mold against the surface of the patterning layer; and irradiating the patterning layer with light, thereby curing the composition of the invention to form a micropattern.

Here, it is preferable that the curable composition for imprints of the invention is, after being irradiated with light, further heated and cured. Concretely, the patterning layer comprising at least the composition of the invention is applied onto a substrate (base or support) and optionally dried to form a layer comprising the composition of the invention (patterning layer), thereby preparing a pattern acceptor (having the patterning layer formed on the substrate), then a mold is pressed against the surface of the patterning layer of the pattern acceptor to thereby transfer the mold pattern, and the micropatterned layer is cured through photoirradiation. The photoimprint lithography by the patterning method of the invention may enable lamination and multi-layer patterning, and therefore, may be used in combination with an ordinary thermoimprint.

The curable composition for imprints of the invention may form a finer micropattern at low cost and with high accuracy by a photoimprint method. Accordingly, the composition of the invention can form micropatterns heretofore formed by conventional photolithography technology at low cost and with high accuracy. For example, when the composition of the invention is applied onto a substrate or a support, and the layer comprising the composition is exposed to light, cured, and optionally dried (baked), it thus can be employed as a permanent film of an overcoat layer or an insulating film, and the like for use in liquid-crystal displays (LCD); and the like, and as an etching resist for semiconductor integrated circuits, recording materials, flat panel displays, or the like. In particular, the patterns formed by using the curable composition for imprints of the invention are excellent in etching property, and can be preferably used as an etching resist in dry etching using fluorocarbon, etc.

In the permanent films (resists for structural members) for use in liquid-crystal displays (LCD), and the like, and in the resists for use for substrate processing for electronic materials, the resist is preferably prevented from being contaminated as much as possible with metallic or organic ionic impurities in order that the resist does not interfere with the performance of the products. Accordingly, it is desirable that the concentration of the metallic or organic ionic impurities in the curable composition for imprints of the invention is at most 1000 ppm, preferably at most 10 ppm, and more preferably at most 100 ppb.

The patterning method (pattern transferring method) with the curable composition for imprints of the invention is described concretely hereinunder.

In the patterning method of the invention, the composition of the invention is first applied onto a support to form a patterning layer thereon.

The coating method for applying the curable composition for imprints of the invention onto a substrate may be a well known coating method of, for example, a dip coating method, an air knife coating method, a curtain coating method, a wire bar coating method, a gravure coating method, an extrusion coating method, a spin coating method, a slit scanning method, an inkjet method, etc. Particularly preferred are an inkjet method and a spin coating method from the viewpoint of the mold chargeability and reduction of the residual film thickness. The thickness of the patterning method of the composition of the invention may vary depending on the use thereof, and may be from 0.03 μm to 30 μm or so. The composition of the invention may be applied in a mode of multilayer coating. Between the substrate and the patterning method of the composition of the invention, any other organic layer may be formed, such as a planarizing layer, etc. With that, the patterning layer is not kept in direct contact with the substrate, and therefore, the substrate may be prevented from being contaminated with dust or from being scratched. The pattern to be formed of the composition of the invention may have good adhesiveness to the organic layer, if any, formed on the substrate.

The substrate (base or support) to which the curable composition for imprints of the invention is applied may be selected from various materials depending on its use, including, for example, quartz, glass, optical film, ceramic material, vapor deposition film, magnetic film, reflective film, metal substrate of Ni, Cu, Cr, Fe or the like, paper, SOG (spin on glass), polymer substrate such as polyester film, polycarbonate film or polyimide film, TFT array substrate, PDP electrode plate, glass or transparent plastic substrate, electroconductive substrate of ITO, metal or the like, insulating substrate, semiconductor substrate such as silicon, silicon nitride, polysilicon, silicon oxide or amorphous silicon, which, however, are not limitative. The shape of the substrate is not also specifically defined. It may be tabular or roll. As described below, the substrate may be light-transmissive or non-light-transmissive, depending on the combination thereof with a mold.

Next, in the patterning method of the invention, a mold is pressed against the surface of the patterning layer for transferring the pattern from the mold onto the patterning layer. Accordingly, the micropattern previously formed on the pressing surface of the mold is transferred onto the patterning layer.

The mold material usable in the invention is described. IN the photoimprint lithography with the composition of the invention, a light-transmissive material is selected for at least one of the mold material and/or the substrate. In the photoimprint lithography applied to the invention, the curable composition for imprints of the invention is applied onto a substrate to form a patterning layer thereon, and a light-transmissive mold is pressed against the surface of the layer, then this is irradiated with light from the back of the mold and the patterning layer is thereby cured. Alternatively, the curable composition for photoimprints is applied onto a light-transmissive substrate, then a mold is pressed against it, and this is irradiated with light from the back of the substrate whereby the curable composition for photoimprints can be cured.

The photoirradiation may be attained while the mold is kept in contact with the layer or after the mold is released. In the invention, preferably, the photoirradiation is attained while the mold is kept in contact with the patterning layer.

The mold usable in the invention has a transferable pattern formed thereon. The pattern of the mold may be formed, for example, through photolithography, electronic beam lithography or the like by which a pattern may be formed to a desired processing accuracy. In the invention, however, the mold patterning method is not specifically defined.

Not specifically defined, the light-transmissive mold material for use in the invention may be any one having a desired strength and durability. Concretely, its examples include glass, quartz, light-transparent resin such as PMMA or polycarbonate resin, transparent metal deposition film, flexible film of polydimethylsiloxane or the like, photocured film, metal film, etc.

The non-light-transmissive mold to be used in the invention where a light-transmissive substrate is used is not also specifically defined and may be any one having a predetermined strength. Concretely, examples of the mold material include ceramic material, deposition film, magnetic film, reflective film, metal material of Ni, Cu, Cr, Fe or the like, as well as SiC, silicon, silicon nitride, polysilicon, silicon oxide, amorphous silicon, etc. However, these are not limitative. The shape of the mold is not also specifically defined, and may be any of a tabular mold or a roll mold. The roll mold is used especially when continuous transfer in patterning is desired.

The mold for use in the patterning method of the invention may be processed for surface release treatment for the purpose of enhancing the releasability of the curable composition for imprint of the invention from the mold. The mold of the type includes those surface-treated with a silicone-type or fluorine-containing silane coupling agent, for which, for example, commercial release agents such as Daikin's Optool DSX, Sumitomo 3M's Novec EGC-1720 and others are preferred.

In photoimprint lithography with the composition of the invention, in general, the mold pressure in the patterning method of the invention is preferably at most 10 atmospheres. When the mold pressure is at most 10 atmospheres, then the mold and the substrate are hardly deformed and the patterning accuracy tends to increase. It is also favorable since the pressure unit may be small-sized since the pressure to be given to the mold may be low. The mold pressure is preferably selected from the region capable of securing the mold transfer uniformity, within a range within which the residual film of the curable composition for imprints in the area of mold pattern projections may be reduced.

In the patterning method of the invention, the dose of photoirradiation in the step of irradiating the patterning layer with light may be sufficiently larger than the dose necessary for curing. The dose necessary for curing may be suitably determined depending on the degree of consumption of the unsaturated bonds in the curable composition for imprints and on the tackiness of the cured film as previously determined.

In the photoimprint lithography applied to the invention, the substrate temperature in photoirradiation may be room temperature; however, the photoirradiation may be attained under heat for enhancing the reactivity. In the previous stage of photoirradiation, preferably, the system is kept in vacuum as effective for preventing contamination with bubbles or contamination with oxygen or for preventing the reduction in reactivity, and as effective for enhancing the adhesiveness of the curable composition for imprints with mold. The system may be subjected to photoirradiation while still kept in vacuum. In the patterning method of the invention, the vacuum degree in photoirradiation is preferably from $10^{-1}$ Pa to ordinary pressure.

Light to be used for photoirradiation to cure the curable composition for imprints of the invention is not specifically defined. For example, it includes light and irradiations with a wavelength falling within a range of high-energy ionizing radiation, near-ultraviolet, far-ultraviolet, visible, infrared, etc. The high-energy ionizing radiation source includes, for example, accelerators such as Cockcroft accelerator, Handegraf accelerator, linear accelerator, betatoron, cyclotron, etc. The electron beams accelerated by such an accelerator are used most conveniently and most economically; but also are any other radioisotopes and other radiations from nuclear reactors, such as γ rays, X rays, α rays, neutron beams, proton beams, etc. The UV sources include, for example, UV fluorescent lamp, low-pressure mercury lamp, high-pressure mercury lamp, ultra-high-pressure mercury lamp, xenon lamp, carbon arc lamp, solar lamp, etc. The radiations include microwaves, EUV, etc. In addition, laser rays for use in microprocessing of semiconductors, such as LED, semiconductor laser ray, 248 nm KrF excimer laser ray, 193 nm ArF excimer laser ray and others, are also favorably used in the invention. These lights may be monochromatic lights, or may also be lights of different wavelengths (mixed lights).

In photoexposure, the light intensity is preferably within a range of from 1 mW/cm$^2$ to 50 mW/cm$^2$. When the light intensity is at least 1 mW/cm$^2$, then the producibility may increase since the photoexposure time may be reduced; and when the light intensity is at most 50 mW/cm$^2$, then it is favorable since the properties of the permanent film formed may be prevented from being degraded owing to side reaction. Also preferably, the dose in photoexposure is within a range of from 5 mJ/cm$^2$ to 1000 mJ/cm$^2$. When the dose is less than 5 mJ/cm$^2$, then the photoexposure margin may be narrow and there may occur problems in that the photocuring may be insufficient and the unreacted matter may adhere to mold. On the other hand, when the dose is more than 1000 mJ/cm$^2$, then the composition may decompose and the permanent film formed may be degraded.

Further, in photoexposure, the oxygen concentration in the atmosphere may be controlled to be less than 100 mg/L by introducing an inert gas such as nitrogen or argon into the system for preventing the radical polymerization from being retarded by oxygen.

In the patterning method of the invention, after the pattern layer is cured through photoirradiation, if desired, the cured pattern may be further cured under heat given thereto. The method may additionally includes the post-curing step. Thermal curing of the composition of the invention after photoirradiation is preferably attained at 150 to 280° C., more preferably at 200 to 250° C. The heating time is preferably from 5 to 60 minutes, more preferably from 15 to 45 minutes.

[Pattern]

The pattern thus formed according to the patterning method of the invention as described in the above can be used as a permanent film for use in liquid-crystal displays (LCD) and others, or as an etching resist. After its production, the permanent film may be bottled in a container such as a gallon bottle or a coated bottle, and may be transported or stored. In this case, the container may be purged with an inert gas such as nitrogen, argon or the like for preventing the composition therein from being degraded. The composition may be transported or stored at ordinary temperature, but for preventing the permanent film from being degraded, it is preferably transported or stored at a controlled temperature of from −20° C. to 0° C. Needless-to-say, the composition is shielded from light to such a level on which its reaction does not go on.

The pattern of the invention formed by the patterning method of the invention is also useful as an etching resist. In cases where the pattern of the invention is used as an etching resist, a nano-order micropattern is first formed on a substrate such as a silicon wafer with a thin film of $SiO_2$ or the like formed thereon, according to the patterning method of the invention. Next, by etching it with an etching gas, such as hydrogen fluoride, or the like in case of wet etching or $CF_4$, or the like in case of dry etching, a desired pattern can be formed on the substrate. The curable composition for imprints is particularly excellent in resistance to dry etching.

EXAMPLES

The characteristics of the invention are described more concretely with reference to Production Examples and Examples given below. In the following Examples, the material used, its amount and the ratio, the details of the treatment and the treatment process may be suitably modified or changed not overstepping the scope of the invention. Accordingly, the invention should not be limitatively interpreted by the Examples mentioned below.

(Method for Measuring Viscosity)

The measurement of the viscosity was conducted at 25±0.2° C. using a RE-80L-type rotational viscometer manufactured by Toki Sangyo Co., Ltd.

The measurement of the viscosity was conducted, respectively, by setting the rotation speed in the measurement at 100 rpm in the case of 0.5 mPa·s or more and less than 5 mPa·s, at 50 rpm in the case of 5 mPa·s or more and less than 10 mPa·s, at 20 rpm in the case of 10 mPa·s or more and less than 30 mPa·s, at 10 rpm in the case of 30 mPa·s or more and less than 60 mPa·s, at 5 rpm in the case of 60 mPa·s or more and less than 120 mPa·s, and at 1 rpm or 0.5 rpm in the case of 120 mPa·s or more.

Synthesis Example 1

Synthesis of Polymerizable Monomer I-1

39.6 g of acrylic acid was dissolved in 80 ml of distilled water, and a solution of 22 g of sodium hydroxide dissolved in 80 ml of distilled water was slowly added thereto. To this solution were added 0.04 g of 4-methoxyphenol, 7.8 g of benzyltributyl ammonium chloride, and 43.8 g of m-xylylene dichloride, and the mixture was reacted at 80° C. for 10 hours. The reaction solution was extracted from ethyl acetate, and the organic phase was washed with an aqueous 1% sodium hydroxide solution, water, and saturated saline water. The organic phase was dried with anhydrous sodium sulfate, and then concentrated to give a crude product. This was purified through column chromatography to give 48 g of a polymerizable monomer I-1. The polymerizable monomer I-1 was liquid at 25° C., and had a viscosity at 25° C. of 10 mPa·s.

Synthesis Example 2

Synthesis of Polymerizable Monomer I-2

8.2 g of acrylic acid was dissolved in 150 ml of acetonitrile, and 15.8 g of potassium carbonate was added thereto. To this was added 20 g of p-xylylene dibromide, and the mixture was reacted at 60° C. for 5 hours. The reaction solution was poured into 1000 ml of water, and the precipitated powder was collected by filtration, washed with water, and dried to give 14 g of a polymerizable monomer I-2. The polymerizable monomer I-2 was solid at 25° C., and had a melting point of 59° C.

Synthesis Example 3

Synthesis of Polymerizable Compound I-3

10 g of 4-hydroxybenzylalcohol was dissolved in 100 ml of acetone, and 21.2 g of triethylamine was added thereto. Under ice-cooling, 17.5 g of acrylic acid chloride was added thereto over 30 minutes. The mixture was reacted at room temperature for 10 hours, and then 300 ml of water was added thereto. This was extracted from ethyl acetate, and the organic phase was washed with an aqueous 1% sodium hydroxide solution, water, and saturated saline water. The organic phase was dried with anhydrous sodium sulfate, and concentrated to give a crude product. This was purified through column chromatography to give 14 g of a polymerizable monomer I-3. The polymerizable monomer I-3 was liquid at 25° C., and had a viscosity at 25° C. of 15 mPa·s.

Synthesis Examples 4 to 6

The polymerizable compounds I-4 to I-6 were synthesized using substantially the same method as in each of the above Synthesis Examples.

The polymerizable monomer I-4 was liquid at 25° C., and had a viscosity at 25° C. of 22 mPa·s.

The polymerizable monomer I-5 was solid at 25° C., and had a melting point of 63° C.

The polymerizable monomer I-6 was liquid at 25° C., and had a viscosity at 25° C. of 14 mPa·s.

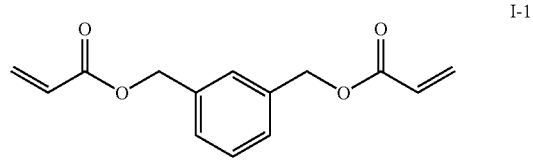

I-1

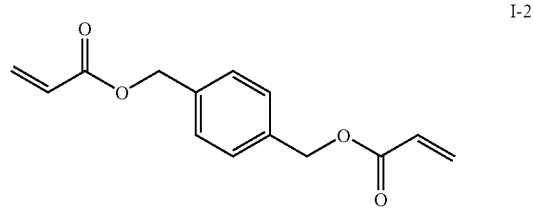

I-2

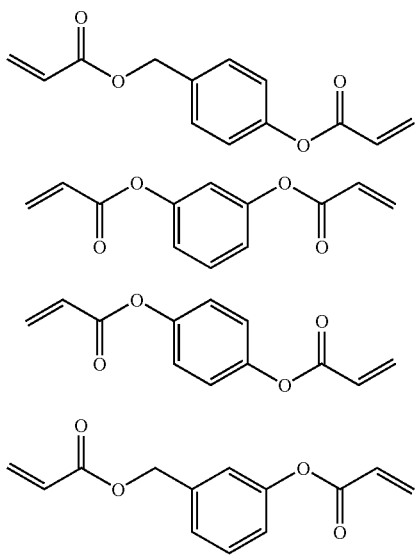

Preparation of Curable Composition for Imprints

Example 1

I-1 (20% by mass) as the polymerizable monomer (Ax) shown in Table 1 below, R-7 (40% by mass), R-1 (30% by mass), and R-2 (10% by mass) as the other polymerizable monomers, the polymerization initiator P-1 (2% by mass) as below, the surfactant W-1 (0.1% by mass) as below, the surfactant W-2 (0.04% by mass) as below, and the antioxidants A-1 and A-2 (1% by mass each) as below were added. In addition, 4-methoxyphenol as a polymerization inhibitor was adjusted to 200 ppm, relative to the polymerizable monomers. This was filtered through a 0.1 μm tetrafluoroethylene-made filter to prepare a curable composition for imprints of Example 1. The total content of polymerizable monomers which are solid at 25° C. and polymerizable monomers having a viscosity at 25° C. of 70 mPa·s or more in the composition was calculated. The obtained value is show as "total content (B) of the polymerizable monomers" in Table 2.

<Other Polymerizable Monomers>

R-1: benzyl acrylate (Biscoat#160: manufactured by Osaka Organic Chemical Industry Ltd.)

R-2: 1-naphthyl methylacrylate (synthesized from 1-naphthol)

R-3: neopentylglycol diacrylate (Kayarad NPGDA: manufactured by Nippon Kayaku Co., Ltd.)

R-4: trimethylolpropane triacrylate (Aronix M-309: manufactured by Toa Gosei Co., Ltd.)

R-5: pentaerythritol teteraacrylate (NK ester A-TMMT: manufactured by Shin-nakamura Chemical Corporation)

R-6: 2-naphthyl acrylate (synthesized from 2-naphthol)

R-7: 9-acryloxymethylfluorene (synthesized from flourene methanol)

R-8: N-vinylpyrrolidone (manufactured by Aldrich)

TABLE 1

| Polymerizable monomer | State at 25° C. | Viscosity at 25° C. (mPa · s) |
|---|---|---|
| R-1 | Liquid | 2.3 |
| R-2 | Liquid | 24 |
| R-3 | Liquid | 5.7 |
| R-4 | Liquid | 72 |
| R-5 | Liquid | 1200 |
| R-6 | Solid | — |
| R-7 | Solid | — |
| R-8 | Liquid | 2 |
| I-1 | Liquid | 10 |
| I-2 | Solid | — |
| I-3 | Liquid | 15 |
| I-4 | Liquid | 22 |
| I-5 | Solid | — |
| I-6 | Liquid | 14 |

<Polymerization Initiator>

P1: 2,4,6-trimethylbenzoyl-ethoxyphenyl-phosphineoxide (Lucirin TPO-L: manufactured by BASF Corporation)

<Surfactants>

W-1: fluorine-containing surfactant (manufactured by Tochem Products).

W-2: silicone-type surfactant (Megafac Paintad 31: manufactured by Dai-Nippon Ink).

<Antioxidants>

A-1: Sumilizer GA80 (manufactured by Sumitomo Chemical).

A-2: Adekastab AO503 (manufactured by Adeka).

Examples 2 to 18 and Comparative Examples 1 to 7

The curable composition for the imprints of each of Examples and Comparative Examples was prepared in the same manner as in Example 1, except that the polymerizable monomer (Ax) was changed into the one shown in Table 2 below, and the other polymerizable monomer was changed into the one shown in Table 1 above.

(Evaluation)

The obtained curable composition for the imprints of each of Examples and Comparative Examples was evaluated as follows. The results are shown in Table 2 below.

<Dry Etching Resistance>

A resist (curable composition for imprints) was applied onto an Si wafer so that its thickness after being cured could be 1 μm, and then while not pressed against a mold, this was exposed to light in a nitrogen atmosphere at a light exposure dose of 240 mJ/cm$^2$, thereby forming a cured film. Using a dry etcher (U-621) manufactured by Hitachi High-Technology, this was dry-etched with plasma of a gas of Ar/$C_4F_6$/$O_2$=100:4:2 for 2 minutes, the residual film amount was measured, and the etching rate per second was computed. The resulting etching rate was standardized, based on the value, 1, in Comparative Example 1. By comparison thereto, Examples and Comparative Examples were evaluated. The smaller values indicate better dry etching resistance.

<Evaluation of Stability Over Time>

(Low-Temperature Storage Stability)

The obtained composition was put into a brown sample bottle, stored at 5° C. for 2 weeks, returned to room temperature, a patterning experiment was then conducted, and comparison with the curable compositions for imprints immediately after preparation was made as below.

Each composition was applied onto a silicone substrate in a mode of spin coating. A mold of quartz having a rectangular line/space pattern (1/1) with a line width of 100 nm and a groove thickness of 100 nm, of which the surface had been processed with fluorine, was put on the obtained coating film, and set in a imprinting device. The device was degassed in a vacuum, and then nitrogen was introduced to the device by conducting nitrogen purging. The mold was pressed against the substrate under a pressure of 1 MPa at 25° C., and then this was exposed to light under a condition of 240 mJ/cm² from the back of the mold. After the exposure, the mold was released to give a pattern. It was checked with a scanning electromicroscope and an optical microscope as to whether or not the pattern transfer defects were present or absent therein due to the foreign bodies, and evaluation was conducted in the same manner as below.

A: No pattern transfer defect was found.
B: Just a few pattern transfer defects were found.
C: Pattern transfer defects were found over the entire surface.

(High-Temperature Storage Stability)

The obtained composition was put into a brown sample bottle, stored at 40° C. for 2 weeks, returned to room temperature, a patterning experiment was then conducted, and comparison with the curable compositions for imprints immediately after preparation was made as below.

Each composition was applied onto a silicone substrate in a mode of spin coating. A mold of quartz having a rectangular line/space pattern (1/1) with a line width of 100 nm and a groove thickness of 100 nm, of which the surface had been processed with fluorine, was put on the obtained coating film, and set in a imprinting device. The device was degassed in a vacuum, and then nitrogen was introduced to the device by conducting nitrogen purging. The mold was pressed against the substrate under a pressure of 1 MPa at 25° C., and then this was exposed to light under a condition of 240 mJ/cm² from the back of the mold. After the exposure, the mold was released to give a pattern. The obtained pattern profile was observed with a scanning electromicroscope, and evaluation was conducted in the same manner as below.

TABLE 2

| | Polymerizable monomer (Ax) (wt %) | Other polymerizable monomer (wt %) | | | Total content (B) of the polymerizable monomers (wt %) | Dry etching resistance | Low-temperature storage stability | | High-temperature storage stability | |
|---|---|---|---|---|---|---|---|---|---|---|
| | | | | | | | Immediately after preparation | After 2 weeks at 5° C. | Immediately after preparation | After 2 weeks at 40° C. |
| Example 1 | I-1 (20) | R-7 (40) | R-1 (30) | R-2 (10) | 40 | 1 | A | B | A | A |
| Example 2 | I-1 (20) | R-7 (20) | R-1 (30) | R-2 (30) | 20 | 1 | A | B | A | A |
| Example 3 | I-1 (20) | | R-1 (30) | R-2 (50) | 0 | 1 | A | A | A | A |
| Comparative Example 1 | I-1 (20) | R-7 (50) | R-1 (30) | | 50 | 1 | A | C | A | A |
| Example 4 | I-1 (40) | R-6 (40) | R-2 (20) | | 40 | 1.1 | A | B | A | A |
| Example 5 | I-1 (40) | R-6 (20) | R-2 (40) | | 20 | 1.1 | A | B | A | A |
| Example 6 | I-1 (40) | | R-2 (60) | | 0 | 1.1 | A | A | A | A |
| Comparative Example 2 | I-1 (40) | R-6 (60) | | | 60 | 1.1 | A | C | A | A |
| Comparative Example 3 | I-1 (20) | R-5 (40) | R-1 (30) | R-4 (10) | 50 | 1.7 | A | A | A | B |
| Comparative Example 4 | I-1 (20) | R-5 (20) | R-1 (30) | R-4 (30) | 50 | 1.7 | A | A | A | A |
| Comparative Example 5 | I-1 (20) | | R-1 (30) | R-4 (50) | 50 | 1.6 | A | A | A | A |
| Comparative Example 6 | I-1 (20) | R-5 (50) | R-1 (30) | | 50 | 1.8 | A | A | A | C |
| Example 7 | I-1 (55) | R-2 (45) | | | 0 | 1.1 | A | A | A | A |
| Comparative Example 7 | | R-2 (45) | R-3 (55) | | 0 | 1.4 | A | A | A | A |
| Example 8 | I-2 (20) | R-2 (80) | | | 20 | 1 | A | A | A | A |
| Example 9 | I-3 (20) | R-2 (80) | | | 0 | 1 | A | A | A | A |
| Example 10 | I-4 (20) | R-2 (80) | | | 0 | 1 | A | A | A | A |
| Example 11 | I-5 (20) | R-2 (80) | | | 20 | 1 | A | A | A | A |
| Example 12 | I-6 (20) | R-2 (80) | | | 0 | 1 | A | A | A | A |
| Example 13 | I-1 (55) | R-8 (45) | | | 0 | 1.25 | A | A | A | A |
| Example 14 | I-1 (45) | R-6 (55) | | | 55 | 1.1 | A | B | A | A |
| Example 15 | I-1 (50) | R-6 (50) | | | 50 | 1.1 | A | B | A | A |
| Example 16 | I-1 (55) | R-6 (45) | | | 45 | 1.1 | A | A | A | A |
| Example 17 | I-1 (70) | R-6 (30) | | | 30 | 1.1 | A | A | A | A |
| Example 18 | I-1 (100) | — | | | 0 | 1.1 | A | A | A | A |

A: A rectangular pattern substantially complementary to the mold was obtained.
B: The pattern top was roundish.
C: The pattern top was roundish, and the height of the pattern was low.

From Table 2, it could be confirmed that in Example 1 to 3 in which the proportion of R-7 in the solid state at 25° C. was lowered to less than 50% by mass, relative to Comparative Example 1, the dry etching resistance and the high-temperature storage stability were equivalent, and the low-temperature storage stability was excellent, relative to Comparative Example 1.

In Examples 4 to 6 in which R-6 in the solid state at 25° C. was at less than 50% by mass, and substituted with R-2 in the liquid state relative to Comparative Example 2, it could be confirmed that the dry etching resistance and the high-temperature storage stability were equivalent, and the low-temperature storage stability was excellent, relative to Comparative Example 2.

In Comparative Examples 3 to 6, the total content of the polymerizable monomers having a viscosity at 25° C. of 70 mPa·s or more was set at 50% by mass or more.

In Example 7 in which the compound (Ax) was used, relative to Comparative Example 7 in which R-3 different from the compound (Ax) was used, the high-temperature storage stability and the low-temperature storage stability were equivalent, and the dry etching resistance was excellent, relative to Comparative Example 7.

In Examples 8 to 12 in which the polymerizable monomers I-2 to I-5 were used as the polymerizable compound (Ax), it could be confirmed that they all exhibited good low-temperature storage stability, high-temperature storage stability, and dry etching resistance.

In Example 13 in which N-vinyl pyrrolidone having neither an aromatic structure nor an alicylic hydrocarbon structure as a monofunctional (meth)acrylate, it could be confirmed that it exhibited good dry etching resistance, low-temperature storage stability, and high-temperature storage stability, relative to all the Comparative Examples.

Examples 14 to 18 can be compared with Comparative Example 2. When the content of the polymerizable monomer (Ax) is increased from 40% by mass (Comparative Example 2) to 45% and 50% by mass (Examples 14 and 15), the low-temperature storage stability was improved from rank C (Comparative Example 2) to rank B (Examples 14 and 15). When the content of the polymerizable monomer (Ax) is increased to 55% by mass (Example 16), the low-temperature storage stability was further improved to rank A. When the content of the polymerizable monomer (Ax) is still increased to 70% and 100% by mass (Examples 17 and 18), the low-temperature storage stability was equivalent to Example 16. It could be confirmed that the low-temperature storage stability was improved as the content of the polymerizable monomer (Ax) increased.

Examples satisfying both (A) and (B) were excellent in dry etching resistance, low-temperature storage stability, and high-temperature storage stability.

From the above, it could be confirmed that the curable compositions for imprints of Examples of the invention all exhibited good low-temperature storage stability, the high-temperature storage stability, and dry etching resistance.

The present disclosure relates to the subject matter contained in Japanese Patent Application No. 179987/2008 filed on Jul. 10, 2008 and Japanese Patent Application No. 145523/2009 filed on Jun. 18, 2009, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A curable composition for imprints, comprising at least one polymerizable monomer and a photopolymerization initiator, wherein:

the curable composition for imprints comprises at least one polymerizable monomer (Ax) represented by the following formula (I):

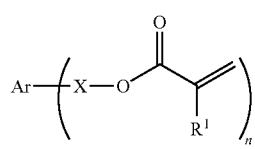

Formula (I)

wherein Ar represents a divalent or trivalent aromatic group which may have a substituent, X represents a single bond or an organic linking group selected from an alkylene group and an oxyalkylene group, $R^1$ represents a hydrogen atom or an alkyl group which may have a substituent, and n represents 2 or 3, the content of polymer ingredients having a molecular weight of at least 2000 in the curable composition for imprints is at most 2% by mass of the composition except the solvent therein, 50% by mass or more of all the polymerizable monomers contained in the curable composition are polymerizable monomers which are liquid at 25° C., when the curable composition comprises a difunctional polymerizable monomer other than the polymerizable monomer (Ax), the difunctional polymerizable monomer is selected from the group consisting of diethylene glycol monoethyl ether (meth)acrylate, dimethylol-dicyclopentane di(meth)acrylate, di(meth)acrylated isocyanurate, 1,3-butylene glycol di(meth)acrylate, EO-modified 1,6-hexanediol di(meth)acrylate, ECH-modified 1,6-hexanediol di(meth)acrylate, allyloxy-polyethylene glycol acrylate, 1,9-nonanediol di(meth)acrylate, EO-modified bisphenol A di(meth)acrylate, PO-modified bisphenol A di(meth)acrylate, modified bisphenol A di(meth)acrylate, EO-modified bisphenol F di(meth)acrylate, ECH-modified hexahydrophthalic acid diacrylate, hydroxypivalic acid neopentyl glycol di(meth)acrylate, neopentyl glycol di(meth)acrylate, EO-modified neopentyl glycol diacrylate, propyleneoxide (hereinafter referred to as "PO")-modified neopentyl glycol diacrylate, caprolactone-modified hydroxypivalate neopentyl glycol, stearic acid-modified pentaerythritol di(meth)acrylate, ECH-modified phthalic acid di(meth)acrylate, poly(ethylene glycol-tetramethylene glycol) di(meth)acrylate, poly(propylene glycol-tetramethylene glycol) di(meth)acrylate, polyester (di)acrylate, polyethylene glycol di(meth)acrylate, polypropylene glycol di(meth)acrylate, ECH-modified propylene glycol di(meth)acrylate, silicone di(meth)acrylate, triethylene glycol di(meth)acrylate, tetraethylene glycol di(meth)acrylate, dimethyloltricyclodecane di(meth)acrylate, neopentyl glycol-modified trimethylolpropane di(meth)acrylate, tripropylene glycol di(meth)acrylate, EO-modified tripropylene glycol di(meth)acrylate, triglycerol di(meth)acrylate, dipropylene glycol di(meth)acrylate, divinylethylene-urea and divinylpropylene-urea, and the curable composition for imprints satisfies at least one of the following (A) or (B):

(A) the content of the polymerizable monomer (Ax) represented by the formula (I) in the curable composition for imprints is more than 50% by mass, relative to all the polymerizable monomers contained in the composition, or (B) the total content of polymerizable monomers which are solid at 25° C. and polymerizable monomers having a viscosity at 25° C. of 70 mPa·s or more in the curable composition for imprints is less than 50% by mass, relative to all the polymerizable monomers contained in the composition.

2. The curable composition for imprints according to claim 1, wherein the total content of polymerizable monomers which are solid at 25° C. and polymerizable monomers having a viscosity at 25° C. of 70 mPa·s or more in the curable composition for imprints is less than 50% by mass, relative to all the polymerizable monomers contained in the composition.

3. The curable composition for imprints according to claim 1, wherein 80% by mass or more of all the polymerizable monomers contained in the curable composition for imprints is a polymerizable monomer which is liquid at 25° C.

4. The curable composition for imprints according to claim 1, wherein the polymerizable monomer (Ax) has a viscosity at 25° C. of less than 70 mPa·s.

5. The curable composition for imprints according to claim 1, wherein in the formula (I), Ar is a phenylene group.

6. The curable composition for imprints according to claim 1, which comprises a polymerizable monomer represented by the following formula (I-a) or (I-b):

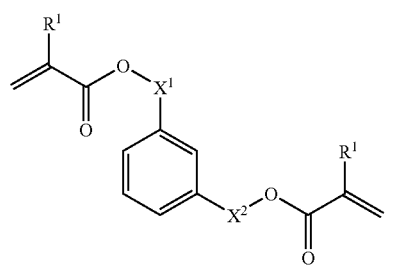

Formula (I-a)

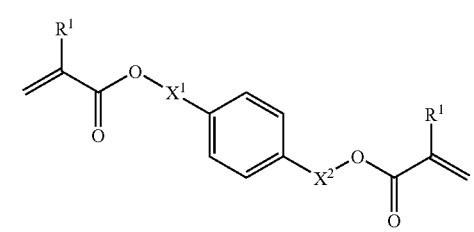

Formula (I-b)

wherein $X^1$ and $X^2$ each independently represent a single bond or an alkylene group which may have a substituent having from 1 to 3 carbon atoms, and $R^1$ represents a hydrogen atom or a methyl group.

7. The curable composition for imprints according to claim 6, wherein $X^1$ and $X^2$ in formulae (I-a) and (I-b) each independently represents a single bond or a methylene group.

8. The curable composition for imprints according to claim 1, wherein the polymerizable monomer (Ax) is at least one of the following compounds:

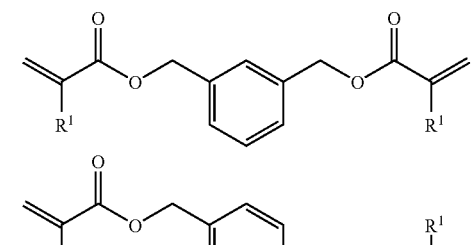
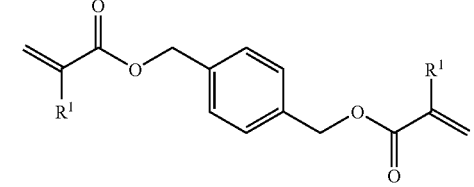
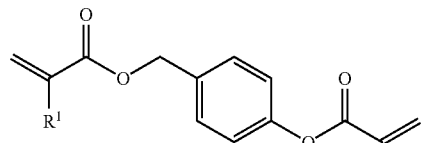
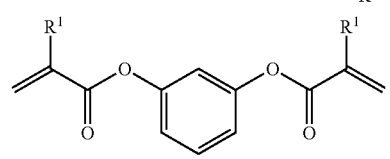
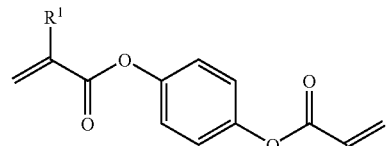
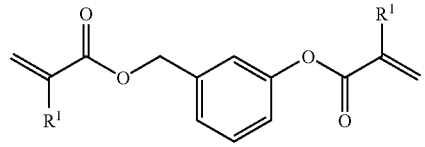
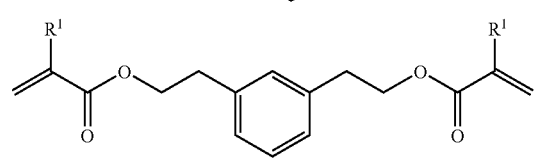
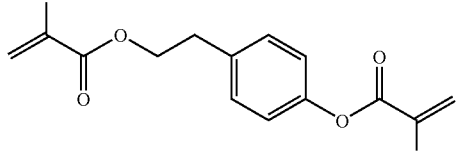
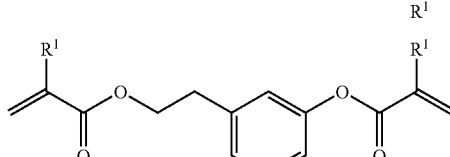
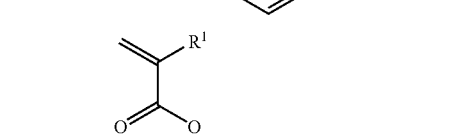
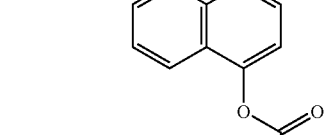
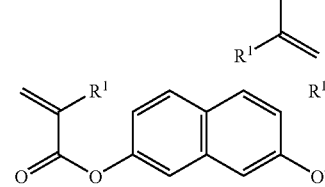

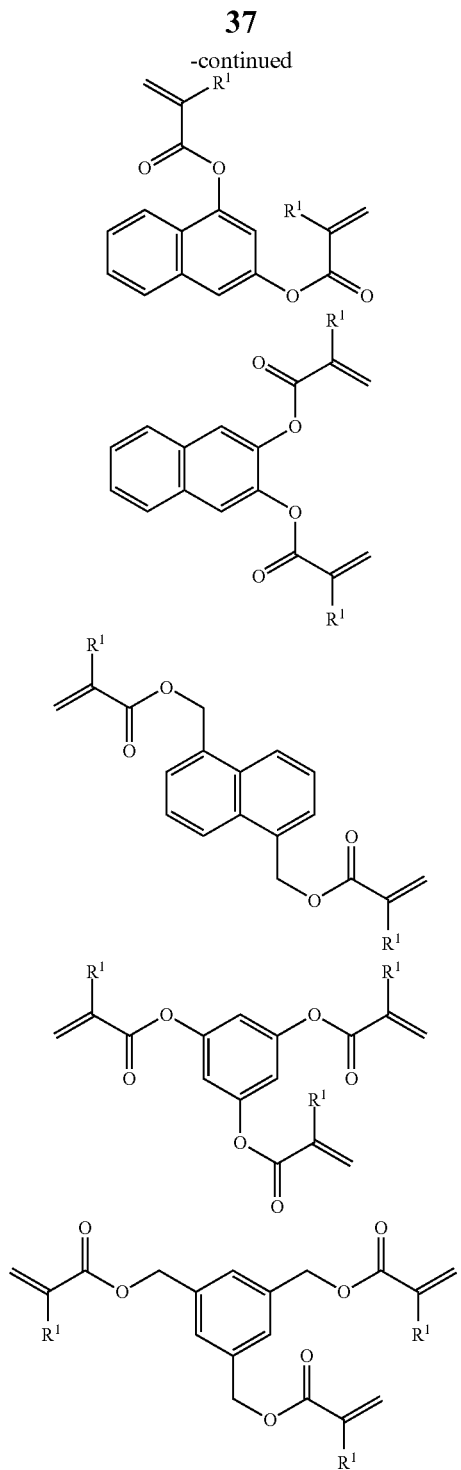

9. The curable composition for imprints according to claim 1, wherein the polymerizable monomer (Ax) is at least one of the following compounds:

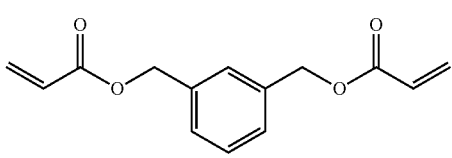

10. The curable composition for imprints according to claim 1, wherein the at least one polymerizable monomer further comprises a monofunctional (meth) acrylate having at least one structure of an aromatic ring structure or an alicyclic hydrocarbon structure.

11. The curable composition for imprints according to claim 1, which further comprises at least one of a nonionic surfactant or an antioxidant.

12. The curable composition for imprints according to claim 1, wherein 60% by mass or more of all the polymerizable monomers contained in the curable composition are polymerizable monomers which are liquid at 25° C.

13. The curable composition for imprints according to claim 1, wherein the difunctional polymerizable monomer is selected from the group consisting of diethylene glycol monoethyl ether (meth)acrylate, dimethylol-dicyclopentane di(meth)acrylate, di(meth)acrylated isocyanurate, EO-modified 1,6-hexanediol di(meth)acrylate, ECH-modified 1,6-hexanediol di(meth)acrylate, allyloxy-polyethylene glycol acrylate, EO-modified bisphenol A di(meth)acrylate, PO-modified bisphenol A di(meth)acrylate, modified bisphenol A di(meth)acrylate, EO-modified bisphenol F di(meth)acrylate, ECH-modified hexahydrophthalic acid diacrylate, hydroxypivalic acid neopentyl glycol di(meth)acrylate, EO-modified neopentyl glycol diacrylate, propyleneoxide (hereinafter referred to as "PO")-modified neopentyl glycol diacrylate, caprolactone-modified hydroxypivalate neopentyl glycol, stearic acid-modified pentaerythritol di(meth)acrylate, ECH-modified phthalic acid di(meth)acrylate, poly(ethylene glycol-tetramethylene glycol) di(meth)acrylate, poly (propylene glycol-tetramethylene glycol) di(meth)acrylate, polyester (di)acrylate, polyethylene glycol di(meth)acrylate, polypropylene glycol di(meth)acrylate, ECH-modified propylene glycol di(meth)acrylate, silicone di(meth)acrylate, triethylene glycol di(meth)acrylate, tetraethylene glycol di(meth)acrylate, dimethyloltricyclodecane di(meth)acrylate, neopentyl glycol-modified trimethylolpropane di(meth)acrylate, tripropylene glycol di(meth)acrylate, EO-modified tripropylene glycol di(meth)acrylate, triglycerol di(meth)acrylate, dipropylene glycol di(meth)acrylate, divinylethylene-urea and divinylpropylene-urea.

14. The curable composition for imprints according to claim 1, wherein 60% by mass or more of all the polymerizable monomers contained in the curable composition are polymerizable monomers which are liquid at 25° C., and the difunctional polymerizable monomer is selected from the group consisting of diethylene glycol monoethyl ether (meth) acrylate, dimethylol-dicyclopentane di(meth)acrylate, di(meth)acrylated isocyanurate, EO-modified 1,6-hexanediol di(meth)acrylate, ECH-modified 1,6-hexanediol di(meth)acrylate, allyloxy-polyethylene glycol acrylate, EO-modified bisphenol A di(meth)acrylate, PO-modified bisphenol A di(meth)acrylate, modified bisphenol A di(meth)acrylate, EO-modified bisphenol F di(meth)acrylate, ECH-modified hexahydrophthalic acid diacrylate, hydroxypivalic acid neopentyl glycol di(meth)acrylate, EO-modified neopentyl glycol diacrylate, propyleneoxide (hereinafter referred to as "PO")-modified neopentyl glycol diacrylate, caprolactone-modified hydroxypivalate neopentyl glycol, stearic acid-modified pentaerythritol di(meth)acrylate, ECH-modified phthalic acid di(meth)acrylate, poly(ethylene glycol-tetramethylene glycol) di(meth)acrylate, poly(propylene glycol-tetramethylene glycol) di(meth)acrylate, polyester (di)acrylate, polyethylene glycol di(meth)acrylate, polypropylene glycol di(meth)acrylate, ECH-modified propylene glycol di(meth)acrylate, silicone di(meth)acrylate, triethylene glycol di(meth)acrylate, tetraethylene glycol di(meth)acrylate, dimethyloltricyclodecane di(meth)acrylate, neopentyl glycol-modified trimethylolpropane di(meth)acrylate, tripropylene glycol di(meth)acrylate, EO-modified tripropylene glycol di(meth)acrylate, triglycerol di(meth)acrylate, dipropylene glycol di(meth)acrylate, divinylethylene-urea and divinylpropylene-urea.

15. A curable composition for imprints, comprising at least one polymerizable monomer and a photopolymerization initiator, wherein:
the curable composition for imprinting comprises at least one polymerizable monomer (Ax) represented by the following formula (I):

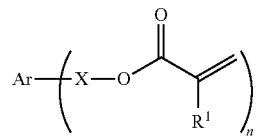

wherein Ar represents a divalent or trivalent aromatic group which may have a substituent, X represents a single bond or an organic linking group, $R^1$ represents a hydrogen atom or an alkyl group which may have a substituent, and n represents 2 or 3, the curable composition for imprints further comprises a monofunctional polymerizable monomer in an amount of at least 15% by mass relative to the total amount of the polymerizable monomers, and the curable composition for imprints satisfies at least one of the following (A) or (B):

(A) the content of the polymerizable monomer (Ax) represented by the formula (I) in the curable composition for imprints more than 50% by mass, relative to all the polymerizable monomers contained in the composition, or (B) the total content of the polymerizable monomers which are solid at 25° C. and polymerizable monomers having viscosity at 25° C. of 70 mPa·s or more in the curable composition for imprints is less than 50% by mass, relative to all the polymerizable monomers contained in the composition.

* * * * *